(12) United States Patent
Karicherla et al.

(10) Patent No.: US 12,491,096 B2
(45) Date of Patent: Dec. 9, 2025

(54) THIN-FILM NEURAL INTERFACES WITH STENT-ASSISTED DEPLOYMENT

(71) Applicant: Verily Life Sciences LLC, South San Francisco, CA (US)

(72) Inventors: Annapurna Karicherla, Cupertino, CA (US); Peng Cong, Burlingame, CA (US); Ken Rys, Winchester, MA (US); Bo Lu, Santa Clara, CA (US)

(73) Assignee: Verily Life Sciences LLC, Dallas, TX (US)

( * ) Notice: Subject to any disclaimer, the term of this patent is extended or adjusted under 35 U.S.C. 154(b) by 629 days.

(21) Appl. No.: 17/924,082

(22) PCT Filed: Apr. 2, 2021

(86) PCT No.: PCT/US2021/025541
§ 371 (c)(1),
(2) Date: Nov. 8, 2022

(87) PCT Pub. No.: WO2021/247131
PCT Pub. Date: Dec. 9, 2021

(65) Prior Publication Data
US 2023/0172732 A1 Jun. 8, 2023

Related U.S. Application Data

(60) Provisional application No. 63/035,245, filed on Jun. 5, 2020.

(51) Int. Cl.
*A61N 1/04* (2006.01)
*A61B 5/00* (2006.01)
(Continued)

(52) U.S. Cl.
CPC .............. *A61F 2/90* (2013.01); *A61B 5/4064* (2013.01); *A61F 2/95* (2013.01); *A61N 1/04* (2013.01)

(58) Field of Classification Search
CPC ...... A61N 1/0558; A61N 1/04; A61B 5/4064; A91F 2/90
See application file for complete search history.

(56) References Cited

U.S. PATENT DOCUMENTS

2017/0036012 A1 2/2017 Tabada et al.

FOREIGN PATENT DOCUMENTS

| DE | 10028522 A1 | 12/2001 |
|---|---|---|
| EP | 1280613 A1 | 2/2003 |
| WO | 2012097297 A2 | 7/2012 |

OTHER PUBLICATIONS

Application No. PCT/US2021/025541, International Search Report and Written Opinion, Mailed On Jul. 8, 2021, 7 pages.

*Primary Examiner* — Dinah Baria
(74) *Attorney, Agent, or Firm* — Kilpatrick Townsend & Stockton LLP

(57) ABSTRACT

The present disclosure relates to thin-film lead assemblies and neural interfaces with stent-assisted deployment, and methods of microfabricating thin-film lead assemblies and neural interfaces. Particularly, aspects of the present disclosure are directed to a medical device having a thin-film neural interface, a stent, and a cable. The thin-film neural interface includes a first supporting structure, electrodes formed on the first supporting structure, and an encapsulation material encasing a portion of the first supporting structure. The cable includes a second supporting structure, conducive traces formed on the second supporting structure and electrically connected with the electrodes, and the encapsulation material encasing at least a portion of the second supporting structure. The stent is at least partially embedded in the encapsulation material encasing the portion of the first supporting structure, and the thin-film neural interface is helically wrapped around at least a portion of the stent.

20 Claims, 10 Drawing Sheets

(51) Int. Cl.
*A61F 2/90* (2013.01)
*A61F 2/95* (2013.01)

THIN-FILM NEURAL INTERFACES WITH STENT-ASSISTED DEPLOYMENT

CROSS-REFERENCE TO RELATED APPLICATION

This application is a U.S. National Phase of PCT Application No. PCT/US2021/025541, filed Apr. 2, 2021, which claims priority to and the benefit of U.S. Provisional Application No. 63/035,245, filed Jun. 5, 2020, both of which are incorporated herein by reference in [its] their entirety.

FIELD

The present disclosure relates to thin-film neural interfaces, and in particular to thin-film neural interfaces with stent-assisted deployment, methods of fabricating thin-film neural interfaces incorporating a stent, and methods for delivering thin-film neural interfaces with stent-assisted deployment.

BACKGROUND

Normal neural activity is an intricate balance of electrical and chemical signals, which can be disrupted by a variety of causes (genetic, chemical or physical trauma) that affect the nervous system, causing cognitive, motor and sensory impairments. The ability to monitor brain electrical and chemical activity in real time and with noninvasive or minimally invasive techniques is important for both the understanding of nervous system functioning in health and disease and the development of effective treatment options for those disorders. Moreover, the ability to restore the diseased nervous system to an intact and normal-functioning state or substitute lost function with brain-actuated assistive devices is dependent on techniques to translate that monitoring information into effective treatment modalities, e.g., to stimulate brain tissue and modulate brain activity. One example of neuroprosthesis/brain-machine interface (BMI) and neuromodulation technology, deep brain stimulation (DBS), has proven to be effective for treatment of essential tremor disorder, Parkinson's disease, dystonia, epilepsy and psychiatric disorders such as depression, obsessive compulsive disorder and Tourette syndrome. Another example of neuroprosthesis/BMI and neuromodulation technology, brain-computer interfacing (BCI), translates specific features of signals recorded from the brain into outputs that allow the user to act on the world without the participation of peripheral nerves and muscles and has proven effective for motor rehabilitation following stroke, Parkinson's disease, and psychiatric disorders.

Neuroprosthesis/BMI and neuromodulation devices and systems tend to have a similar form factor, derived from their predecessors, e.g. the pacemaker or defibrillator. Such neuroprosthesis/BMI and neuromodulation devices and systems typically comprise an implantable, semi-implantable or external processing unit (e.g., a neurostimulator with a pulse generator, a processor with signal recorder, or the like) having electronics connected to a lead assembly that can deliver electrical pulses to or record signals from electrodes interfaced with nerves or nerve bundles via a neural interface. The lead assembly is typically formed of a conductive material and takes the form of an insulated wire connected to the neural interface via a connector on one end (e.g., a distal end) and optionally the electronics of the processing unit via another connector on another end (e.g., a proximal end). In some instances (e.g., deep implants), the lead assembly comprises additional conductors and connectors such as extension wires or a cable connected via connectors between the electrodes and the electronics of the processing unit. Neural interfaces may function as a stimulation or brain signal monitoring (and translation) device. The primary function of a BMI or, equivalently, BCI, is the monitoring of brain signals (and translation). In other words, a BMI is a neuroprosthetic system able to directly convey commands to the external world circumventing the conventional neuromuscular pathways. On the other hand, the primary function of a neurostimulation device is the recording of signals from nerves and the generation and providing of stimulation signals to nerves (sometimes in response to the recording). The brain recording and/or stimulating neuroprosthetics are often employed either for treatment of neurologic conditions and their symptoms (e.g., deep brain stimulation) or for the replacement of impaired sensory modalities (e.g., retinal implants) and may involve neuromodulation through the stimulation of nerves or brain tissue.

BRIEF SUMMARY

In various embodiments, a medical device is provided that comprises: a thin-film neural interface comprising: a first portion of a supporting structure comprised of dielectric material; a wiring layer formed on the first portion of the supporting structure; one or more electrodes formed on the first portion of the supporting structure and electrically connected to the wiring layer; and one or more encapsulation layers encasing a portion of the first portion of the supporting structure; a stent at least partially embedded in the one or more encapsulation layers, where the thin-film neural interface is helically wrapped around at least a portion of the stent; and a cable comprising: a second portion of the supporting structure comprised of the dielectric material; one or more conductive traces formed on the second portion of the supporting structure and electrically connected with the wiring layer; and the one or more encapsulation layers encasing at least a portion of the second portion of the supporting structure.

In some embodiments, the cable further comprises a polymer tube and the second portion of the supporting structure is helically wrapped around the polymer tube.

In some embodiments, the polymer tube comprises a lumen.

In some embodiments, the one or more encapsulation layers comprise a first encapsulation layer and a second encapsulation layer, the first encapsulation layer encases the portion of the first portion of the supporting structure leaving at least top surfaces of the one or more electrodes exposed, and the first encapsulation layer and the second encapsulation layer completely encase the second portion of the supporting structure.

In some embodiments, the stent is at least partially embedded in the first encapsulation layer.

In some embodiments, the dielectric material is liquid crystal polymer.

In some embodiments, the one or more encapsulation layers are comprised of polyurethane.

In some embodiments, the thin-film neural interface is helically wrapped around at least the portion of the stent such that an edge to edge distance of less than 0.5 mm is present between each turn of helixes.

In some embodiments, the second portion of the supporting structure is helically wrapped around the polymer tube such that an edge to edge distance of at least 0.5 mm is present between each turn of helixes.

In some embodiments, the cable further comprises a proximal end and a distal end, and the thin-film neural interface is disposed at the distal end of the cable.

In some embodiments, the medical device further comprises: a connector disposed at the proximal end of the cable and electrically connected to the one or more conductive traces; and a neurostimulator or computing device electrically connected with the one or more electrodes via the connector, the one or more conductive traces, and the wiring layer.

In various embodiments, a method of manufacturing a thin-film lead assembly is provided that comprises: forming a first layer of polymer on a polymer tube and a first heat shrink tube disposed on a mandrel; obtaining a thin-film structure comprising a neural interface portion and a cable portion; helically wrapping the cable portion around the polymer tube and the neural interface portion around the first heat shrink tube; forming a second layer of polymer on the cable portion; placing a second heat shrink tube over the second layer of polymer and the neural interface portion; heating the cable portion and the neural interface portion to: (i) reflow the first layer of polymer and the second layer of polymer around at least a portion of the cable portion, (ii) reflow the first layer of polymer around a portion of the neural interface portion, and (iii) recover the second heat shrink tube defining an outer diameter of the cable portion; unwrapping the neural interface portion from the first heat shrink tube; helically wrapping the neural interface portion around at least a portion of a stent; placing a third heat shrink tube over the neural interface portion; and heating the neural interface portion to: (i) reflow the first layer of polymer around at least a portion of the stent, (ii) recover the third heat shrink tube compressing the neural interface portion and the stent, and (iii) obtain the thin-film lead assembly.

In some embodiments, the method further comprises obtaining an initial structure comprising: (i) the polymer tube disposed around a first portion of the mandrel, and (ii) the first heat shrink tube disposed around a second portion of the mandrel.

In some embodiments, the neural interface portion comprises: a first portion of a supporting structure, a wiring layer formed on the first portion of the supporting structure, and one or more electrodes formed on the first portion of the supporting structure and electrically connected to the wiring layer, and where the cable portion comprises a second portion of the supporting structure, and one or more conductive traces formed on the second portion of the supporting structure and electrically connected with the wiring layer.

In some embodiments, the first portion of the supporting structure is comprised of liquid crystal polymer, the second portion of the supporting structure is comprised of liquid crystal polymer, the first layer of polymer is comprised of polyurethane, and the second layer of polymer is comprised of polyurethane.

In some embodiments, the method further comprises removing the third heat shrink tube and inserting the thin-film lead assembly into a delivery device that maintains the neural interface portion and the stent in a compressed configuration.

In some embodiments, the thin-film neural interface is helically wrapped around at least the portion of the stent such that an edge to edge distance of less than 0.5 mm is present between each turn of helixes.

In some embodiments, the cable portion is helically wrapped around the polymer tube such that an edge to edge distance of at least 0.5 mm is present between each turn of helixes.

In some embodiments, the unwrapping the neural interface portion comprises cutting through the reflowed first layer of polymer along a cut line defined by the first portion of a supporting structure, separating helixes of the neural interface portion along the cut line, and unwrapping the neural interface portion from the first heat shrink tube.

In various embodiments, a method of delivering a neural interface to a target biological structure is provided that comprises: obtaining a thin-film lead assembly comprising: a thin-film structure comprising a neural interface portion and a cable portion, where the neural interface portion comprises: a first portion of a supporting structure, one or more electrodes formed on the first portion of the supporting structure, and one or more encapsulation layers encasing a portion of the first portion of the supporting structure, and where the cable portion comprises: a second portion of the supporting structure, the one or more encapsulation layers encasing at least a portion of the second portion of the supporting structure, and a polymer tube with a lumen and the second portion of the supporting structure is helically wrapped around the polymer tube; a stent at least partially embedded in the one or more encapsulation layers, where the thin-film neural interface is helically wrapped around at least a portion of the stent; and a delivery device disposed over the thin-film lead assembly that maintains the neural interface portion and the stent in a compressed configuration; inserting a guide wire into the lumen of the thin-film lead assembly; delivering, using the guide wire, the thin-film lead assembly to the target biological structure; removing the delivery device and guide wire from the thin-film lead assembly; and deploying, using the stent, the neural interface, where the deploying comprises expanding the stent from the compressed configuration to an expanded configuration that places the one or more electrodes into contact with the target biological structure.

In some embodiments, the second portion of the supporting structure is helically wrapped around the polymer tube such that an edge to edge distance of at least 0.5 mm is present between each turn of helixes, and where the thin-film neural interface is helically wrapped around at least the portion of the stent such that an edge to edge distance of less than 0.5 mm is present between each turn of helixes.

BRIEF DESCRIPTION OF THE DRAWINGS

The present disclosure will be better understood in view of the following non-limiting figures, in which.

DETAILED DESCRIPTION

I. Introduction

Figure 1:
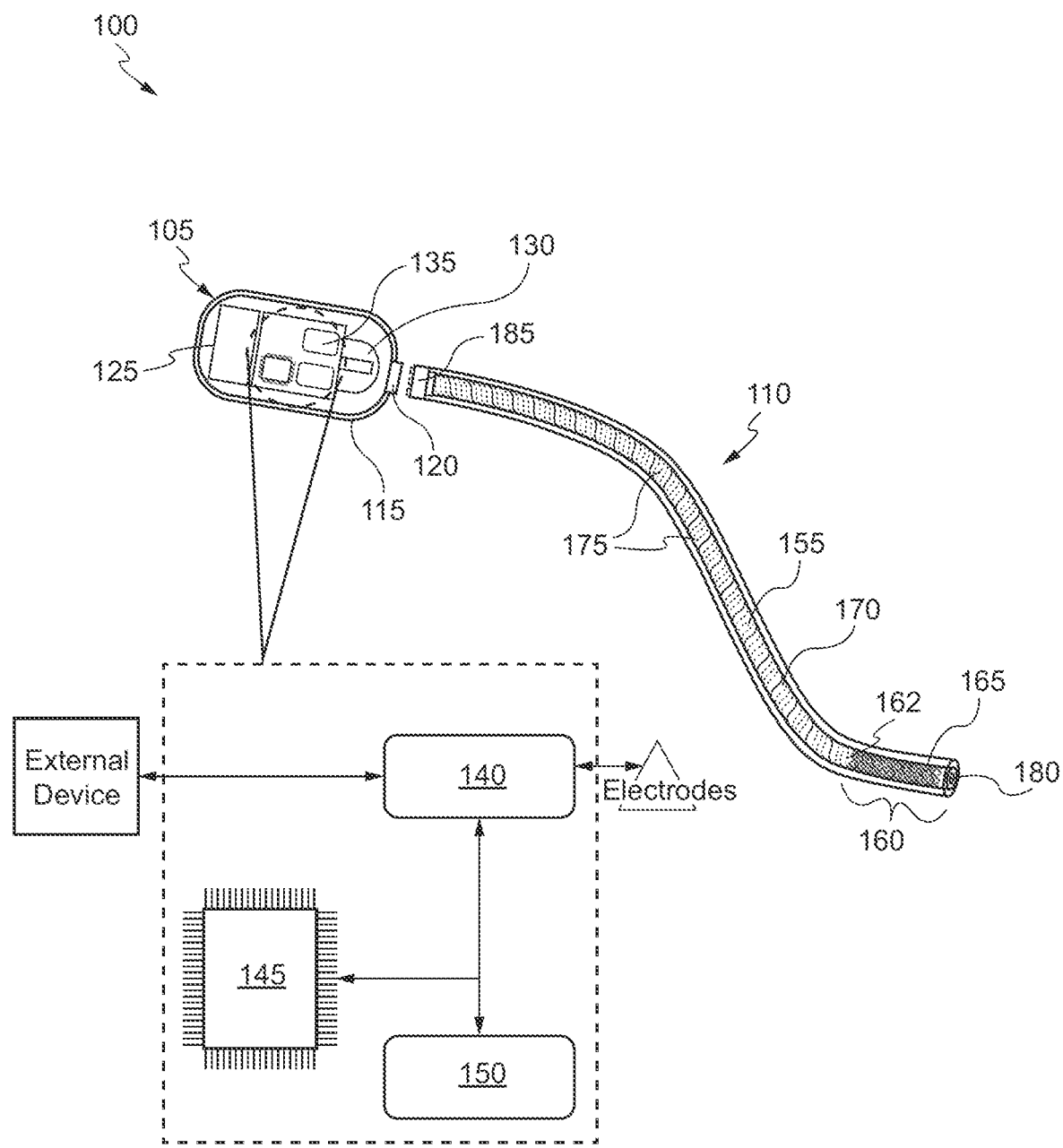
FIG. 1 shows a neuromodulation/BMI system in accordance with various embodiments.

The following disclosure describes thin-film lead assemblies and neural interfaces with stent-assisted deployment, methods of microfabricating thin-film lead assemblies and neural interfaces incorporating a stent formed on the neural interface, and stent-assisted deployment methods for delivering thin-film lead neural interfaces. As used herein, the phrases "microfabrication" and "microfabricating" refers to the process of fabricating miniature structures on micrometer scales and smaller. The major concepts and principles of microfabrication are microlithography, doping, thin-films, etching, bonding, and polishing. As used herein, the phrase "thin-films" refers to a layer of material ranging from fractions of a nanometer (monolayer) to several micrometers in thickness (e.g., between a few nanometers to about 100 µm, or the thickness of a few atoms). Thin-films may be deposited by applying a very thin film of material (e.g., between a few nanometers to about 100 µm, or the thickness of a few atoms) onto a substrate surface to be coated, or onto a previously deposited layer of thin film. In various embodiments, the thin-film lead assemblies and neural interfaces provided herein comprise a base polymer body (e.g., a supporting structure), at least one conductive trace formed on the base polymer body, a stent embedded in the base polymer body with electrodes wrapped around the stent, where the one or more electrodes are in electrical connection with the at least one conductive trace formed on the base polymer body.

Limitations associated with conventional thin-film lead assemblies and neural interfaces is that individual electrodes are manually attached to a substrate, and thus are mechanically unstable and can lead to open circuits with the neural tissue during catheter delivery or stent deployment. For example, neural interfaces that include electrodes can be manually attached to a substrate using a curable adhesive, welding, or a conductive epoxy, which are fragile and not reliable for long-term use. Materials like conductive epoxy are not biocompatible and are not suitable for long-term use. Even if the electrodes are securely attached to a substrate for long-term use in endovascular procedures, processes that involve adhesive bonding and welding are labor intensive and require manual attachment of each electrode to the substrate. Additionally, there is a desire to use smaller electrodes with higher electrode density for improved electrical stimuli. However, there are many challenges to creating such a neural interface. For example, adhesion of electrodes can degrade over time under exposure to bodily fluid, exposing an open circuit to the tissue. This ultimately results in mechanical and/or performance failure.

To address these limitations and problems, the thin-film lead assemblies and neural interfaces of various embodiments disclosed herein comprises a stent that is incorporated (e.g., embedded) in one or more layers of the supporting structure of the neural interface, where the electrode assembly (e.g., one or more electrodes in electrical connection with one or more conductive traces of the plurality of conductive traces) wraps around the stent for stent-assisted deployment of the thin-film neural interface. For example, a thin-film lead assembly may comprise a thin-film neural interface comprising: a first portion of a supporting structure comprised of dielectric material; a wiring layer formed on the first portion of the supporting structure; one or more electrodes formed on the first portion of the supporting structure and electrically connected to the wiring layer; and one or more encapsulation layers encasing a portion of the first portion of the supporting structure. The thin-film lead assembly may further comprise a stent at least partially embedded in the one or more encapsulation layers, where the thin-film neural interface is helically wrapped around at least a portion of the stent. The thin-film lead assembly may further comprise a cable comprising: a second portion of the supporting structure comprised of the dielectric material; one or more conductive traces formed on the second portion of the supporting structure and electrically connected with the wiring layer; and the one or more encapsulation layers encasing at least a portion of the second portion of the supporting structure.

In some embodiments, a method of manufacturing a thin-film lead assembly is provided that comprises: forming a first layer of polymer on a polymer tube and a first heat shrink tube disposed on a mandrel; obtaining a thin-film structure comprising a neural interface portion and a cable portion; helically wrapping the cable portion around the polymer tube and the neural interface portion around the first heat shrink tube; forming a second layer of polymer on the cable portion; placing a second heat shrink tube over the second layer of polymer and the neural interface portion; heating the cable portion and the neural interface portion to: (i) reflow the first layer of polymer and the second layer of polymer around at least a portion of the cable portion, (ii) reflow the first layer of polymer around a portion of the neural interface portion, and (iii) recover the second heat shrink tube defining an outer diameter of the cable portion; unwrapping the neural interface portion from the first heat shrink tube; helically wrapping the neural interface portion around at least a portion of a stent; placing a third heat shrink tube over the neural interface portion; and heating the neural interface portion to: (i) reflow the first layer of polymer around at least a portion of the stent, (ii) recover the third heat shrink tube compressing the neural interface portion and the stent, and (iii) obtain the thin-film lead assembly.

In some embodiments, a method of delivering a neural interface is provided that comprises: obtaining a thin-film lead assembly comprising: a thin-film structure comprising a neural interface portion and a cable portion, where the neural interface portion comprises: a first portion of a supporting structure, one or more electrodes formed on the first portion of the supporting structure, and one or more encapsulation layers encasing a portion of the first portion of the supporting structure, and where the cable portion comprises: a second portion of the supporting structure, the one or more encapsulation layers encasing at least a portion of the second portion of the supporting structure, and a polymer tube with a lumen and the second portion of the supporting structure is helically wrapped around the polymer tube; a stent at least partially embedded in the one or more encapsulation layers, where the thin-film neural interface is helically wrapped around at least a portion of the stent; and a delivery device disposed over the thin-film lead assembly that maintains the neural interface portion and the stent in a compressed configuration; inserting a guide wire into the lumen of the thin-film lead assembly; delivering, using the guide wire, the thin-film lead assembly to the target biological structure; removing the delivery device and guide wire from the thin-film lead assembly; and deploying, using the stent, the neural interface, where the deploying comprises expanding the stent from the compressed configuration to an expanded configuration that places the one or more electrodes into contact with the target biological structure.

Advantageously, these approaches provide a thin-film neural interface, which has improved adhesion between the stent and the electrodes, a smaller footprint, and greater design flexibility. This solution is scalable to interface multiple electrodes with tissue using thin film substrates, and thus enabling several therapeutic opportunities for neurostimulation. Furthermore even for applications where multiple electrodes are not required, various embodiments can be miniaturized to make the implant minimally invasive, additionally may make invasive anatomies to become accessible (or navigable) due to the miniaturization. It should be understood that although deep brain neurostimulation are provided as examples of some embodiments, this solution is applicable to all interfaces, leads, and devices that need electrodes/sensors interfaced with tissue.

II. Neuroprosthesis/BMI Devices and Systems with a Thin-Film Neural Interface

FIG. 1 shows a neurostimulation/BMI system 100 in accordance with some aspects of the present disclosure. In various embodiments, the neurostimulation/BMI system 100 includes a computing device 105 and a thin-film lead assembly 110. In various embodiments, the computing device 105 can be implantable, semi-implantable, or an external system. The computing device 105 may include a housing 115, a feedthrough assembly 120, a power source 125, an antenna 130, and an electronics module 135. For applications where the computing device 105 is implanted, the housing 115 may be comprised of materials that are biocompatible such as bioceramics or bioglasses for radio frequency transparency, or metals such as titanium. In some embodiments, the size and shape of the housing 115 may be selected such that the computing device 105 can be implanted within a patient. In the example shown in FIG. 1, the feedthrough assembly 120 is attached to a hole in a surface of the housing 115 such that the housing 115 is hermetically sealed. The feedthrough assembly 120 may include one or more feedthroughs (i.e., electrically conductive elements, pins, wires, tabs, pads, etc.) mounted within and extending through the surface of the housing 115 or a cap from an interior to an exterior of the housing 115. The power source 125 may be within the housing 115 and connected (e.g., electrically connected) to the electronics module 135 to power and operate the components of the electronics module 135. The antenna 130 may be connected (e.g., electrically connected) to the electronics module 135 for wireless communication with external devices via, for example, radiofrequency (RF) telemetry.

In some embodiments, the electronics module 135 may be connected (e.g., electrically connected) to interior ends of the feedthrough assembly 120 such that the electronics module 135 is able to apply a signal or electrical current to conductive traces of the thin-film lead assembly 110 connected to exterior ends of the feedthrough assembly 120. The electronics module 135 may include discrete and/or integrated electronic circuit components that implement analog and/or digital circuits capable of producing the functions attributed to the neuromodulation or BMI devices or systems such as applying neural stimulation to a patient or sensing and recording electrical activity from a patient. In various embodiments, the electronics module 135 may include software and/or electronic circuit components such as a pulse generator 140 that generates a signal to deliver a voltage, current, optical, or ultrasonic stimulation to a nerve or artery/nerve plexus via electrodes, a controller 145 that determines or senses electrical activity and physiological responses via the electrodes and sensors, controls stimulation parameters of the pulse generator 140 (e.g., control stimulation parameters based on feedback from the physiological responses), causes delivery of the stimulation via the pulse generator 140 and electrodes, and/or records the determined or sensed electrical activity in a storage device, and a memory 150 with program instructions operable on by the pulse generator 140 and the controller 145 to perform one or more processes for: (i) applying or delivering neural stimulation, or (ii) translating neuronal information into commands capable of controlling external software or hardware such as a computer or robotic arm.

In various embodiments, the thin-film lead assembly 110 is a monolithic structure that includes a cable 155 or lead body and a thin-film neural interface 160. In some embodiments, the thin-film neural interface 160 (e.g., an electrode assembly) comprises a thin-film structure having one or more electrodes 162 (i.e., recording electrodes, neurostimulation electrodes, sensors, or combinations thereof) wrapped around a stent 165. In some embodiments, the thin-film neural interface 160 is formed at a distal end of the cable 155. The thin-film neural interface 160 may be formed from the same supporting structure 170 as the cable 155. The supporting structure 170 includes a base dielectric material such as a polymer having suitable dielectric, flexibility and biocompatibility characteristics that provides support for microelectronic structures including conductive traces 175, electrodes 162, wiring layers 180, optional contacts, etc. The wiring layer 180 may be used to directly or indirectly electrically connect the electrodes 162 with the one or more conductive traces 175. The conductive traces 175 may be used to directly or indirectly electrically connect the electrodes 162 with the electronics module 135. The term "directly", as used herein, may be defined as being without something in between. The term "indirectly", as used herein, may be defined as having something in between.

In some embodiments, the thin-film lead assembly 110 further includes a connector 185. In certain embodiments, the connector 185 is bonding material that bonds conductor material of the cable 155 to the electronics module 135 of the device 105 (e.g., the neurostimulator) via the feedthrough assembly 120. The bonding material may be a conductive epoxy or a metallic solder or weld such as platinum. In other embodiments, the connector 185 is conductive wire, conductive traces, or bond pads (e.g., a wire, trace, or bond pads formed of a conductive material such as copper, silver, or gold) formed on a substrate and bonds a conductor of the cable 155 to the electronics module 135 of the device 105. In alternative embodiments, the device 105 and the cable 155 are designed to connect with one another via a mechanical connector 185 such as a pin and sleeve connector, snap and lock connector, flexible printed circuit.

III. Thin-Film Lead Assemblies

Figure 2A:
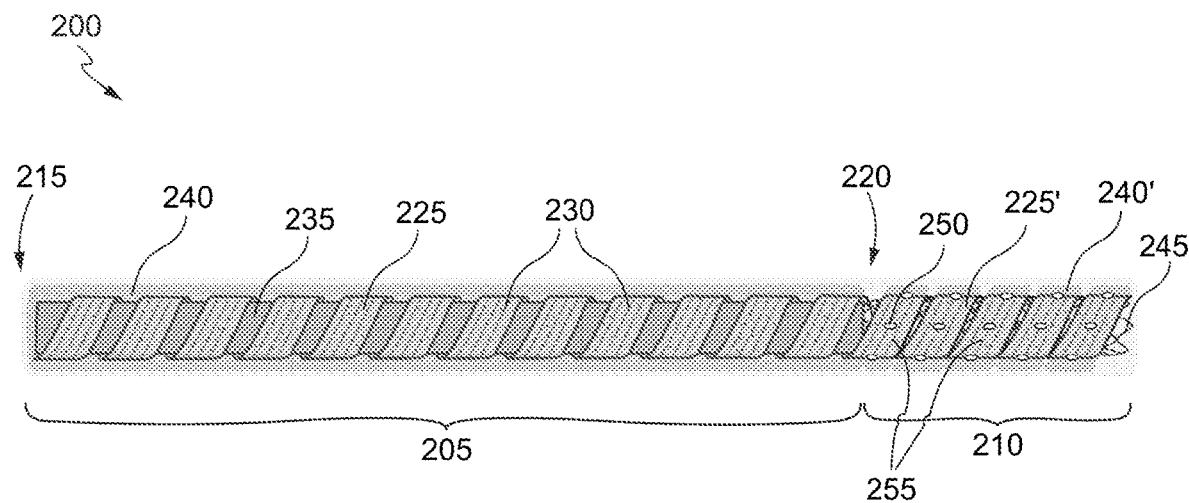
FIGS. 2A and 2B show a thin-film lead assembly in accordance with various embodiments.
Figure 2B:
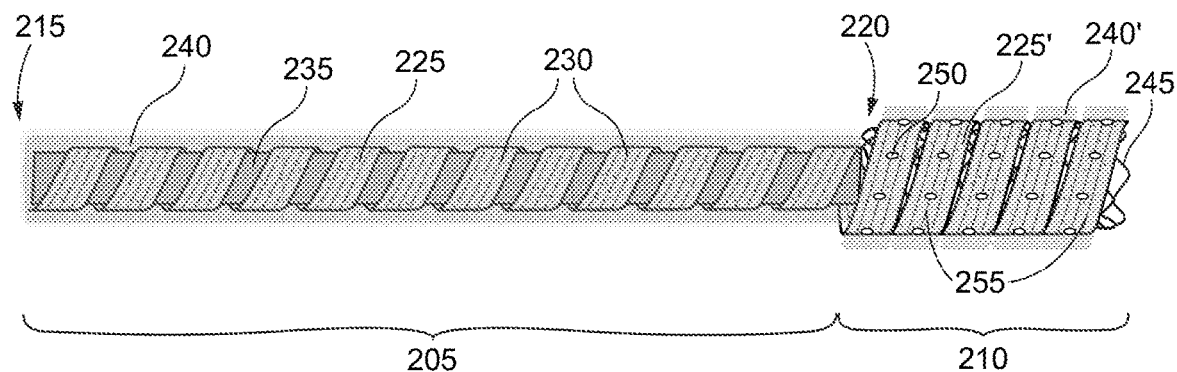

FIGS. 2A and 2B show a thin-film lead assembly 200 (e.g., the thin-film lead assembly 110 described with respect to FIG. 1) in accordance with aspects of the present disclosure. In various embodiments, the thin-film lead assembly 200 comprises a cable 205 and a thin-film neural interface 210 electrically connected to the cable 205. The cable 205 has a proximal end 215 and a distal end 220. As used herein, the term "proximal end" refers to a first end of the cable, while the term "distal end" refers to a second end opposing the first end. For example, the proximal end may be an end of the cable, which is closest to the user, and the distal end may be an end of the cable, which is furthest from the user.

In some embodiments, the thin-film neural interface 210 is disposed at the distal end 220 of the cable 205.

The cable 205 may comprise a supporting structure 225 and one or more conductive traces 230 formed on a portion of the supporting structure 225. As used herein, the term "formed on" refers to a structure or feature that is formed on a surface of another structure or feature, a structure or feature that is formed within another structure or feature, or a structure or feature that is formed both on and within another structure or feature. In some embodiments, the supporting structure 225 extends from the proximal end 215 to the distal end 220. The supporting structure 225 is made of one or more layers of dielectric material (i.e., an insulator). The dielectric material may be selected from the group of electrically nonconductive materials consisting of organic or inorganic polymers, ceramics, glass, glass-ceramics, polyimide-epoxy, epoxy-fiberglass, and the like. For example, the dielectric material may be a polymer of imide monomers (i.e., a polyimide), a liquid crystal polymer (LCP) such as Kevlar®, parylene, polyether ether ketone (PEEK), or combinations thereof. In certain instances, the supporting structure 225 comprises one or more layers of LCP.

In various embodiments, the supporting structure 225 has a thickness (t) from the proximal end 215 to the distal end 220. In some embodiments, the thickness (t) is from 10 μm to 950 μm, for example about 150 μm or about 500 μm. As used herein, the terms "substantially," "approximately," and "about" are defined as being largely but not necessarily wholly what is specified (and include wholly what is specified) as understood by one of ordinary skill in the art. In any disclosed embodiment, the term "substantially," "approximately," or "about" may be substituted with "within [a percentage] of" what is specified, where the percentage includes 0.1, 1, 5, and 10 percent. In some embodiments, the supporting structure 225 has a length (l) of 5 cm to 150 cm or 50 cm to 100 cm, e.g., about 75 cm. In some embodiments, the supporting structure 225 has a width (w) from a first side to a second side. In some embodiments, the width (w) is from 0.5 mm to 5 mm, for example about 0.6 mm or about 4 mm.

In various embodiments, the one or more conductive traces 230 are a plurality of traces, for example, two or more conductive traces or from two to forty-eight conductive traces (e.g., one conductive trace for each electrode/sensor). The plurality of conductive traces 230 are comprised of one or more layers of conductive material. The conductive material selected for the one or more conductive traces 230 should have good electrical conductivity and may include pure metals, metal alloys, combinations of metals and dielectrics, and the like. For example, the conductive material may be copper (Cu), gold (Au), silver (Ag), gold/chromium (Au/Cr), etc. In some embodiments, it is also desirable that the conductive material selected for the one or more conductive traces 230 have thermal expansion characteristics or a coefficient of thermal expansion (CTE) that is approximately equal to that of CTE of the supporting structure 225. Matching the CTE of components that contact one another is desirable because it eliminates the development of thermal stresses, which may occur during fabrication and the operation of the cable, and thus eliminates a known cause of mechanical failure in the components.

The one or more conductive traces 230 may be deposited onto a surface of the supporting structure 225 by using thin film deposition techniques well known to those skilled in the art such as by sputter deposition, chemical vapor deposition, metal organic chemical vapor deposition, electroplating, electroless plating, and the like. In some embodiments, the thickness of the one or more conductive traces 230 is dependent on the particular impedance desired for conductor, in order to ensure excellent signal integrity (e.g., electrical signal integrity for stimulation or recording). For example, if a conductor having a relatively high impedance is desired, a small thickness of conductive material should be deposited onto the supporting structure 225. If, however, a signal plane having a relatively low impedance is desired, a greater thickness of electrically conductive material should be deposited onto the supporting structure 225. In certain embodiments, each of the one or more conductive traces 230 has a thickness (d). In some embodiments, the thickness (d) is from 0.5 μm to 100 μm or from 25 μm to 50 μm, for example about 25 μm or about 40 μm. In some embodiments, each of the one or more conductive traces 225 has a length (m) of about 5 cm to 200 cm or 50 cm to 150 cm, e.g., about 80 cm. In certain embodiments, each of the one or more conductive traces 230 extends from the proximal end 215 to the distal end 220. In some embodiments, each of the one or more conductive traces 230 has a width (y) from 2.0 μm to 500 μm, for example about 30 μm or about 50 μm.

The cable 205 may further comprise a base tube 235. The base tube 235 may comprise a medical grade polymer material. In certain instances, the medical grade polymer is a soft polymer such as silicone. The supporting structure 225 and conductive traces 230 may be helically wrapped around the base tube 235. As used herein, the phrases "helical" or "helically wrapped" refer to a device fabricated with plural helixes or helices, which are a type of smooth space curve, i.e. a curve in three-dimensional space. The helixes may be wrapped in a clockwise direction or anti-clockwise direction. The helixes have the property that a tangent line at any point makes a constant angle with a fixed line called the axis. In some instances, the supporting structure 225 and conductive traces 230 are wrapped loosely around the base tube 235. The "wrapped loosely" configuration means that the turns are loosely packed with an edge to edge distance of at least 0.5 mm between each turn of the helixes.

The cable 205 may further comprise one or more encapsulation layers 240. The one or more encapsulation layers 240 may completely encase at least a portion of the supporting structure 225 and the one or more conductive traces 230. The one or more encapsulation layers 240 may be comprised of a medical grade polymer material. In some embodiments, the medical grade polymer is thermosetting plastic or thermoplastic. For example, the medical grade polymer may be a soft polymer such as silicone, a polymer dispersion such as latex, a chemical vapor deposited poly (p-xylylene) polymer such as parylene, or a polyurethane such as Bionate® Thermoplastic Polycarbonate-urethane (PCU) or CarboSil® Thermoplastic Silicone-Poly carbonate-urethane (TSPCU).

The thin-film neural interface 210 comprises a supporting structure 225', one or more encapsulation layers 240', and a stent 245 embedded at least partially within the one or more encapsulation layers 240'. As used herein, "embedded at least partially" means at least 30% of an object (in this instance the stent) is embedded within the other object (in this instance the one or more encapsulation layers). The supporting structure 225' provides support for microelectronic structures including one or more electrodes 250, a wiring layer 255, and optional contact(s). In various embodiments, the supporting structure 225 of the cable 205 and the supporting structure 225' of the thin-film neural interface 210 are the same structure (i.e., the supporting structure is continuous through the thin-film lead assembly), which creates a monolithic thin-film lead assembly 200. The wiring layer 255 electrically connects each of the one or more electrodes 250 to the one or more conductive traces 230. In some instances, the wiring layer 255 may be formed continuously with the one or more conductive traces 230. For example, each of the one or more conductive traces 230 may extend from the supporting structure 225 through the supporting structure 225' (as the wiring layer 255) and terminate at one or more of the electrodes 250.

In some embodiments, the one or more encapsulation layers 240 of the cable 205 and the one or more encapsulation layers 240' of the thin-film neural interface 210 are the same structure (i.e., the encapsulation layer is continuous through the thin-film lead assembly), which creates a monolithic thin-film lead assembly 200. However, the one or more encapsulation layers 240' of the thin-film neural interface 210 are not disposed over at least a top surface of the one or more electrodes 250 such that the one or more electrodes 250 can directly interface with a biological structure. Consequently, the one or more encapsulation layers 240' of the thin-film neural interface 210 may have less layers of material (e.g., polymer) as compared to the one or more encapsulation layers 240 of the cable 205.

In some embodiments, the stent 245 comprises a mesh framework that is collapsible and expandable, as shown in FIGS. 2A and 2B. The stent 245 can include any mechanical framework or scaffolding that positions the one or more electrodes 250 within a body lumen, such as a vessel, and facilitates interfacing the one or more electrodes 250 with a biological structure such as tissue or fluid. For example, the stent 245 may be collapsed during insertion of the thin-film lead assembly 200 in a subject (e.g., a human patient), and the stent 245 may expand to take the shape of a surrounding body lumen when deployed in the subject. In certain instances, the stent 245 may be adapted to expand when deployed out of an end of a delivery device such as a sheath disposed around the thin-film lead assembly 200 (see, e.g., FIGS. 7A and 7B). Additionally, the stent 245 may be adapted to contract when retracted into the end of the delivery device. Thus, the stent 245 may be adapted to be deployed, retrieved, and re-deployed. The redeployment may take place at a different region within the subject to that of the earlier deployment.

The stent 245 is made of an inert material, which can remain functional in the body for long periods of time (e.g., several months to years). For example, the stent 245 may be laser cut or woven from the inert material in any suitable shape, e.g., a column or tube. In some embodiments, the stent 245 is a mesh tube made of medical-grade metal such as stainless steel or cobalt alloy metal, which fits into a biological structure and expands radially against the walls of the biological structure. In other embodiments, the stent 245 is a self-expanding (e.g., temperature sensitive) mesh tube made of medical-grade "smart metals." For example, the stent 245 may be made of stainless steel, platinum, or shape memory alloys containing nickel and titanium (e.g., nitinol). Shape memory alloys refer to alloys that retain their original shape when exposed to certain conditions (e.g., temperature or pressure). These stents are designed to contract or expand under certain conditions (e.g., contract in cold temperature and expand or return to their original shape under warm temperatures).

The supporting structure 225' and microelectronic structures may be helically wrapped around the stent 245. The helixes may be wrapped in a clockwise direction or anti-clockwise direction. In some instances, the supporting structure 225' and microelectronic structures are wrapped tightly around the stent 245. The "wrapped tightly" configuration means that the turns are tightly packed with an edge to edge distance of less than 0.5 mm between each turn of the helixes. The one or more electrodes 250 are wrapped around the stent 245 for stimulating and/or sensing activity of biological structures such as tissue and/or fluid proximal to the thin-film neural interface 210. The one or more electrodes 250 may be arranged in any suitable configuration on the supporting structure 225' such that the one or more electrodes 250 take on any suitable arrangement wrapped around the stent 245. For example, the one or more electrodes 250 can be arranged as follows: sinusoidal arrangement of electrodes; spiral arrangement of electrodes to enable 360° contact of the electrodes to the wall of a vessel once deployed; and a dense arrangement of electrodes for increased coverage. In some embodiments, the stent 245 is laser cut or woven in a manner such that there is additional material or markers where the thin-film neural interface 210 can wrap around the stent 245 to assist with electrical connection stability of the one or more electrodes 250 and uniformity of electrode locations.

While the thin-film lead assembly has been described at some length and with some particularity with respect to a specific design and/or performance need, it is not intended that the thin-film lead assembly be limited to any such particular design and/or performance need. Instead, it should be understood the thin-film lead assembly described herein is an exemplary embodiment, and that the thin-film lead assembly is to be construed with the broadest sense to include variations of the specific design and/or performance need described herein, as well as other variations that are well known to those of skill in the art. In particular, the shape and location of components and layers in the thin-film lead assembly may be adjusted or modified to meet specific design and/or performance needs. Furthermore, it is to be understood that other structures have been omitted from the description of the thin-film lead assembly for clarity. The omitted structures may include sensor structures, insulating layers, interconnect components, passive devices, etc.

IV. Thin-Film Neural Interfaces

Figure 3A:
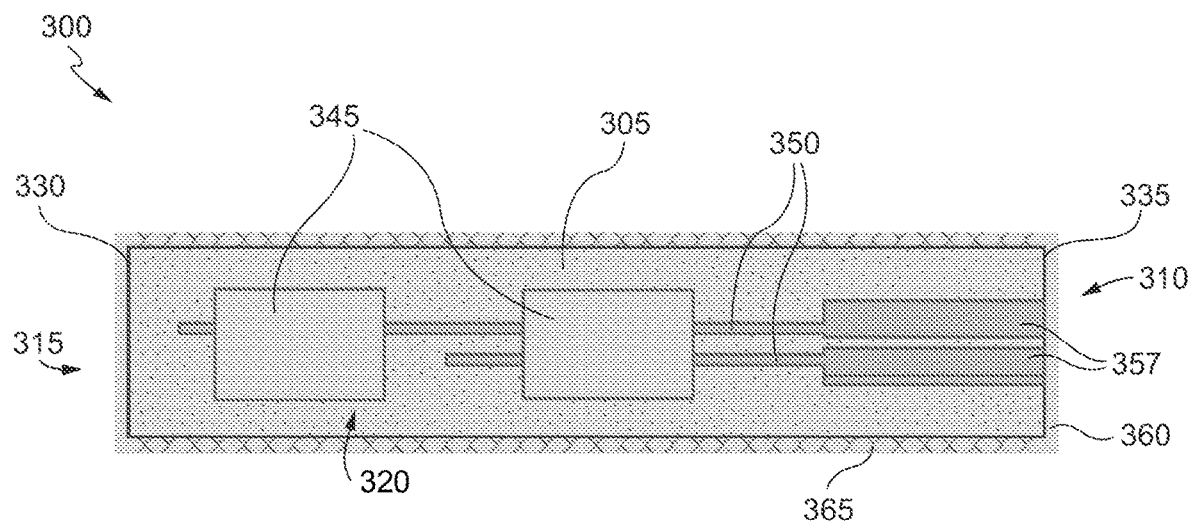
FIGS. 3A and 3B show a thin-film neural interface with stent-assisted deployment in accordance with various embodiments.
Figure 3B:
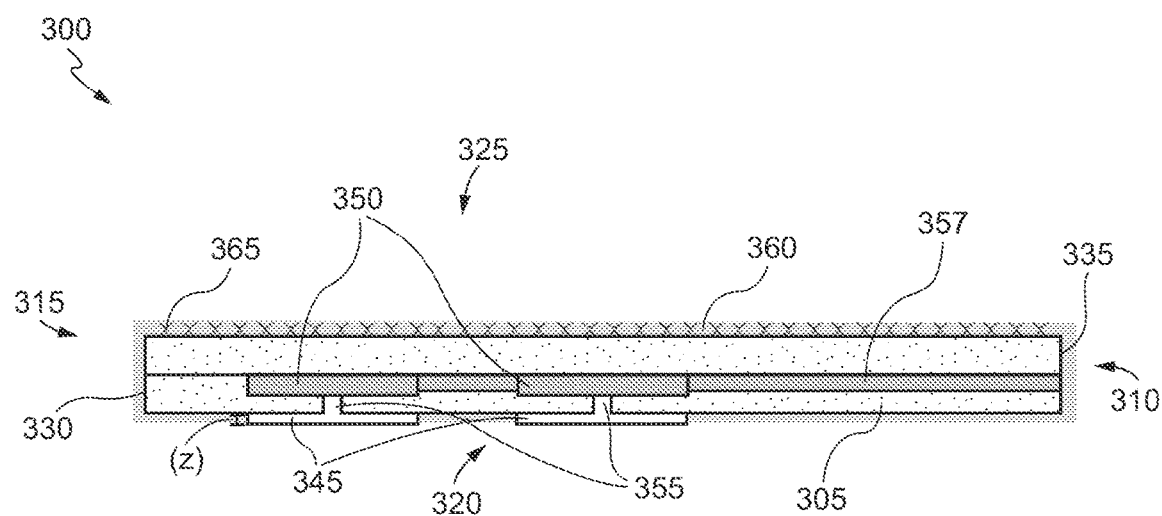

FIGS. 3A (top view) and 3B (cross-sectional view) show a thin-film neural interface 300 with stent-assisted deployment (e.g., the neural interface described with respect to FIGS. 2A and 2B) in accordance with aspects of the present disclosure. The thin-film neural interface 300 comprises a supporting structure 305 having a proximal end 310 and a distal end 315. The supporting structure 305 comprises a front side 320, a back side 325, and opposing edges 330, 335. In some embodiments, the supporting structure 305 is made of one or more layers of dielectric material (i.e., an insulator). The dielectric material may be selected from the group of electrically nonconductive materials consisting of organic or inorganic polymers, ceramics, glass, glass-ceramics, polyimide-epoxy, epoxy-fiberglass, and the like. In certain embodiments, the dielectric material is a polymer of imide monomers (i.e., a polyimide), a liquid crystal polymer (LCP) such as Kevlar®, parylene, polyether ether ketone (PEEK), or combinations thereof. In certain instances, the supporting structure 305 comprises one or more layers of LCP. The supporting structure 305 has a width (w) from the proximal end 310 to the distal end 315. In some embodiments, the width (w) is from 0.01 mm to 3 mm, for example about 0.08 mm or about 0.5 mm. In some embodiments, the supporting structure 305 has a length (l) of 1 mm to 20 cm or 1 mm to 50 mm, e.g., about 10 mm. In some embodiments, the supporting structure 225 has a thickness (t) from the front side 320 to the back side 325. In some embodiments, the thickness (t) is from 10 μm to 950 μm, for example about 150 μm or about 500 μm 0.

The thin-film neural interface 300 further comprises one or more electrodes 345 in electrical connection with a wiring layer 350 directly or via optional contacts 355. The one or more electrodes 345 are formed on the supporting structure 305. In some embodiments, the top surface of the one or more electrodes 345 is coplanar with the top surface of the supporting structure 305. In other embodiments, the top surface of the one or more electrodes 345 is raised above the top surface of the supporting structure 305. The one or more electrodes 345 may be comprised of conductive material such as copper (Cu), gold (Au), silver (Ag), gold/chromium (Au/Cr), platinum (Pt), platinum/iridium (Pt/Ir), titanium (Ti), gold/titanium (Au/Ti), or any alloy thereof, for example. The one or more electrodes 345 may have a thickness (z) of from 0.1 μm to 50 μm, from 0.3 μm to 30 μm, from 0.5 μm to 20 μm, or from 1 μm to 15 μm. In certain embodiments, the contact(s) 355 are formed on the supporting structure 305 and provide electrical contact between the one or more electrodes 345 and the wiring layer 350. The contact(s) 355 may be comprised of conductive material such as copper (Cu), gold (Au), silver (Ag), gold/chromium (Au/Cr), platinum (Pt), platinum/iridium (Pt/Ir), titanium (Ti), gold/titanium (Au/Ti), or any alloy thereof, for example.

The wiring layer 350 may be formed on the supporting structure 305. In various embodiments, the wiring layer 350 is formed continuously with the one or more conductive traces 357 of the cable, and is comprised of various metals or alloys thereof, for example, copper (Cu), gold (Au), silver (Ag), gold/chromium (Au/Cr), platinum (Pt), platinum/iridium (Pt/Ir), titanium (Ti), gold/titanium (Au/Ti), or any alloy thereof. The wiring layer 350 may have a thickness (x) of from 0.5 μm to 100 μm, from 0.5 μm to 15 μm, from 0.5 μm to 10 μm, or from 0.5 μm to 5 μm. In some embodiments, a top surface of the wiring layer 350 is coplanar with a top surface of the supporting structure 305. In other embodiments, the wiring layer 350 is embedded within the supporting structure 305. In yet other embodiments, the wiring layer 350 is formed on the top surface of the supporting structure 305 and the top surface of the wiring layer 350 is raised above the top surface of the supporting structure 305.

The thin-film neural interface 300 further comprises one or more encapsulation layers 360 formed on at least a portion of the supporting structure 305. The one or more encapsulation layers 360 are formed on the back side 325 and wrap around over the opposing edges 330, 335. In some instances, the one or more encapsulation layers 360 may further wrap around over the opposing edges 330, 335 to the front side 320. However, the one or more encapsulation layers 360 do not cover the top surface of the one or more electrodes 345. The one or more encapsulation layers 360 may be comprised of a medical grade polymer material. In some embodiments, the medical grade polymer is thermo-setting plastic or thermoplastic. For example, the medical grade polymer may be a soft polymer such as silicone, a polymer dispersion such as latex, a chemical vapor deposited poly(p-xylylene) polymer such as parylene, or a polyurethane such as Bionate® Thermoplastic Polycarbonate-urethane (PCU) or CarboSil® Thermoplastic Silicone-Poly carbonate-urethane (TSPCU)

The thin-film neural interface 300 further comprises a stent 365 embedded within the one or more encapsulation layers 360. Specifically, some or all of the stent 365 is at least partially embedded within the one or more encapsulation layers 360. The stent 365 may be embedded within the one or more encapsulation layers 360 via reflow of the one or more encapsulation layers 360, as described in detail herein. Advantageously, the stent 365 being embedded within the one or more encapsulation layers 360 attaches the one or more electrodes 345 to the stent 365 such that the one or more electrodes 345 move with the stent 365 as it expands and collapses. This avoids having to manually attach the one or more electrodes 345 to the stent 365 using a curable adhesive, welding, or a conductive epoxy, which are fragile and not reliable for long-term use.

V. Methods for Fabricating Lead Assemblies and Neural Interfaces

FIGS. 4A-4E show structures and respective processing steps for fabricating a thin-film structure 400 (e.g., a portion of the thin-film lead assembly as described with respect to FIGS. 1, 2A, 2B, 3A, and 3B) in accordance with various embodiments. It should be understood by those of skill in the art that thin-film structure 400 can be manufactured in a number of ways using a number of different tools. In general, however, the methodologies and tools used to form the structures of the various embodiments can be adopted from integrated circuit (IC) technology. For example, the structures of the various embodiments, e.g., supporting structure, conductive traces, electrodes, sensors, wiring layers, bond/contact pads, etc., may be built with or without a substrate and realized in films of materials patterned by photolithographic processes. In particular, the fabrication of various structures described herein may typically use three basic building blocks: (i) deposition of films of material on a substrate and/or previous film(s), (ii) applying a patterned mask on top of the film(s) by photolithographic imaging, and (iii) etching the film(s) selectively to the mask.

As used herein, the term "depositing" may include any known or later developed techniques appropriate for the material to be deposited including but not limited to, for example: chemical vapor deposition (CVD), low-pressure CVD (LPCVD), plasma-enhanced CVD (PECVD), semi-atmosphere CVD (SACVD) and high density plasma CVD (HDPCVD), rapid thermal CVD (RTCVD), ultra-high vacuum CVD (UHVCVD), limited reaction processing CVD (LRPCVD), metalorganic CVD (MOCVD), sputtering deposition, ion beam deposition, electron beam deposition, laser assisted deposition, thermal oxidation, thermal nitridation, spin-on methods, physical vapor deposition (PVD), atomic layer deposition (ALD), chemical oxidation, molecular beam epitaxy (MBE), plating (e.g., electroplating), or evaporation.

Figure 4A:
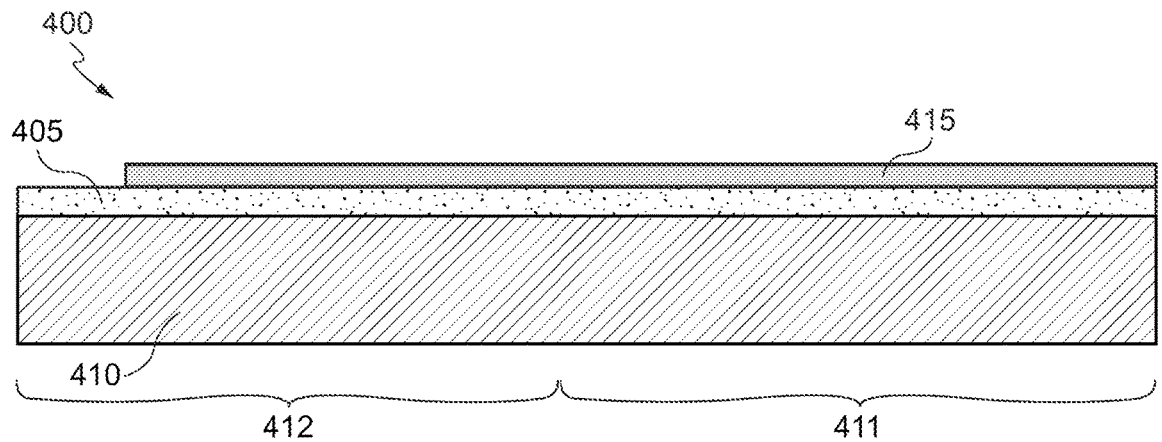
FIGS. 4A-4F show structures and respective processing steps for fabricating a thin-film structure in accordance with various embodiments.

FIG. 4A shows a supporting structure comprising a first polymer layer 405 overlying an optional substrate 410 (e.g., a backer). In various embodiments, the supporting structure may be provided, obtained, or fabricated as a single wafer or panel. The substrate 410 may be comprised of any type of metallic or non-metallic material. For example, the substrate 410 may be comprised of but not limited to silicon, germanium, silicon germanium, silicon carbide, and those materials consisting essentially of one or more Group III-V compound semiconductors having a composition defined by the formula $Al_{X1}Ga_{X2}In_{X3}As_{Y1}P_{Y2}N_{Y3}Sb_{Y4}$, where X1, X2, X3, Y1, Y2, Y3, and Y4 represent relative proportions, each greater than or equal to zero and X1+X2+X3+Y1+Y2+Y3+Y4=1 (1 being the total relative mole quantity). Substrate 410 may additionally or alternatively be comprised of Group II-VI compound semiconductors having a composition $Zn_{A1}Cd_{A2}Se_{B1}Te_{B2}$, where A1, A2, B1, and B2 are relative proportions each greater than or equal to zero and A1+A2+B1+B2=1 (1 being a total mole quantity). The processes to provide, obtain, or fabricate substrate 410, as illustrated and described, are well known in the art and thus, no further description is provided herein.

The first polymer layer 405 may be comprised of one or more layers of dielectric material (i.e., an insulator). The dielectric material may be selected from the group of electrically nonconductive materials consisting of organic or inorganic polymers, ceramics, glass, glass-ceramics, polyimide-epoxy, epoxy-fiberglass, and the like. In certain embodiments, the dielectric material is a polyimide, polyurethane, a LCP, parylene, a PEEK, or combinations thereof. The forming of the first polymer layer 405 may include depositing and curing a dielectric material directly on the substrate 410 without an adhesion promoter. For example, a solution comprised of an imidizable polyamic acid compound dissolved in a vaporizable organic solvent without an adhesion promoter may be deposited (e.g., spin coated) onto the substrate 410. The solution may then be heated at a temperature, preferably less than 250° C., to imidize the polyamic acid compound to form the desired polyimide and vaporize the solvent. The first polymer layer 405 may then be thinned to a desired thickness by planarization, grinding, wet etch, dry etch, oxidation followed by oxide etch, or any combination thereof. This process can be repeated to achieve a desired thickness for the first polymer layer 405. In some embodiments, the first polymer layer 405 may have a thickness from 10 μm to 300 μm.

Figure 4B:
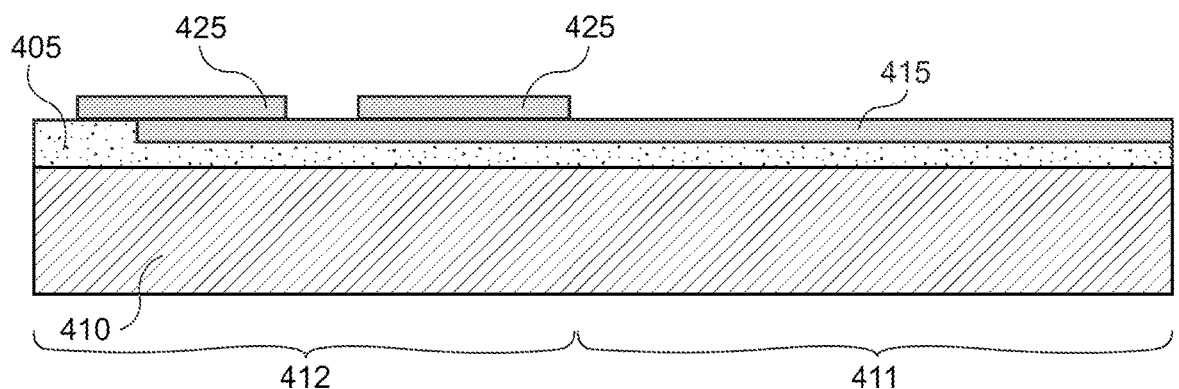
Figure 4C:
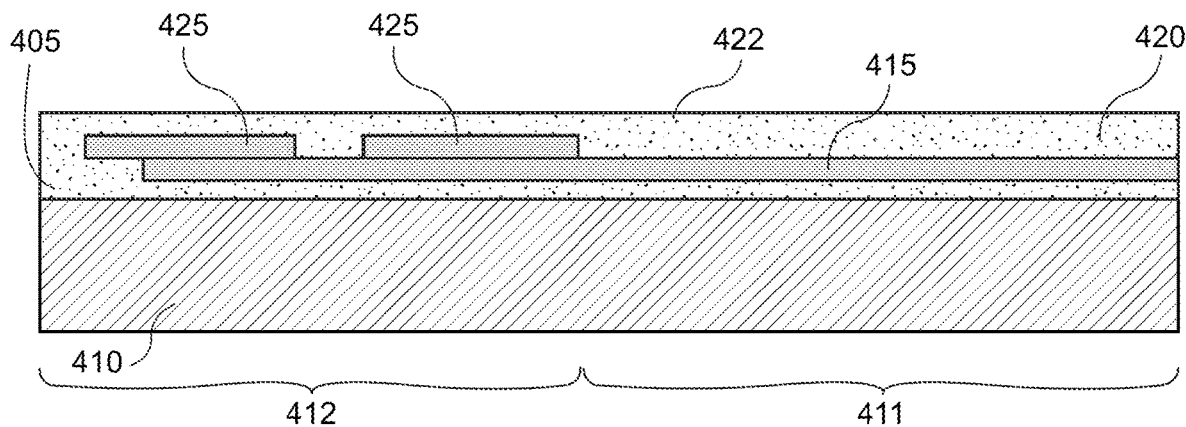

FIGS. 4A, 4B and 4C show forming a cable portion 411 and neural interface portion 412 of the thin-film structure 400. Specifically, FIGS. 4A and 4B show conductive traces 415 formed in a pattern on the cable portion 411 of the first polymer layer 405. In some embodiments, forming the conductive traces 415 may include depositing a seed layer (e.g., a copper (Cu) seed layer, a gold (Au) seed layer, a silver (Ag) seed layer, a gold/chromium (Au/Cr) seed layer, platinum (Pt) seed layer, platinum/iridium (Pt/Ir) seed layer, etc.) over the first polymer layer 405. The seed layer may be configured to enable forming of a conductive trace on the first polymer layer 405 (e.g., through Cu electroplating, Au electroplating, Sn electroplating, Ag electroplating, Au/Cr electroplating, platinum (Pt) electroplating, platinum/iridium (Pt/Ir) electroplating, etc.). Optionally, and prior to forming of the seed layer, an adhesion layer may be deposited over the first polymer layer 405 to enable adequate application of the seed layer. Deposition of either or both of the adhesion layer and seed layer may include sputter deposition Following deposition of the seed layer, a resist pattern may be formed above the first polymer layer 405. The resist pattern may include openings that align over at least a portion of the first polymer layer 405 for forming of a plurality of conductive traces 415 (e.g., a conductive layer with a cross-sectional thickness of 0.5 μm to 100 μm or from 25 μm to 50 μm) on the first polymer layer 405. For example, the resist may be patterned with openings to form: (i) a first conductive trace 415 over a first region of the first polymer layer 405, (ii) a second conductive trace 415 over a second region of the first polymer layer 405, and (iii) a third conductive trace 415 over a third region of the first polymer layer 405. It should be understood by those of skill in the art that different patterns and shapes are also contemplated by the present disclosure to maximize the length of the thin-film structure 400.

In various embodiments, the conductive traces 415 may be deposited through electroplating (e.g., through Cu electroplating, Au electroplating, Sn electroplating, Ag electroplating, Au/Cr electroplating, etc.) and may be positioned over at least a portion of the first polymer layer 405 (e.g., the first region, the second region, and the third region). The electroplating may be performed at a current density of about 4.0 mA/cm2 to about 4.5 mA/cm2. In some embodiments, the exposed area or portion of the first polymer layer 405 may encompass about 8 cm$^2$ to about 10 cm$^2$. The current may be about 14 mA to about 18 mA and the duration may be from about 110 minutes to about 135 minutes to form the conductive traces 415 having a thickness of about 8 μm to about 10 μm. In other embodiments, the exposed area or portion of the first polymer layer 405 may encompass about 10 cm$^2$ to about 18 cm$^2$. The current may be about 18 mA to about 28 mA and the duration may be from about 35 minutes to about 50 minutes to form the wiring layer having a thickness of about 2 μm to about 5 μm.

Following the deposition of the conductive traces 415, the intermediate structure may be subjected to a strip resist to remove the resist pattern and expose portions of the seed layer (portions without wire formation), and optionally the adhesion layer. The exposed portions of the seed layer, and optionally the adhesion layer, may then be subjected to an etch (e.g., wet etch, dry etch, etc.) to remove those portions, thereby isolating the conductive traces 415 over at least a portion of the first polymer layer 405.

FIG. 4C shows an optional second polymer layer 420 formed over the conductive traces 415 and the first polymer layer 405. The second polymer layer 420 may be comprised of dielectric material (i.e., an insulator). The dielectric material may be selected from the group of electrically nonconductive materials consisting of organic or inorganic polymers, ceramics, glass, glass-ceramics, polyimide-epoxy, epoxy-fiberglass, and the like. In certain embodiments, the dielectric material is a polyimide, a LCP, silicone, parylene, a PEEK, or combinations thereof. The second polymer layer 420 may be comprised of the same material or a different material from that of the first polymer layer 405. The forming of the second polymer layer 420 may include depositing and curing of a polymer material directly on the conductive traces 415 and the first polymer layer 405. The second polymer layer 420 may then be thinned to a desired thickness by planarization, grinding, wet etch, dry etch, oxidation followed by oxide etch, or any combination thereof. This process can be repeated to achieve a desired thickness for the second polymer layer 420. In some embodiments, the second polymer layer 420 may have a thickness from 10 μm to 300 μm.

In various embodiments, a third polymer layer 422 may be formed over the second polymer layer 420. In some embodiments, the third polymer layer 422 is only formed over a portion of the second polymer layer 420. The third polymer layer 422 may be comprised of dielectric material (i.e., an insulator). The dielectric material may be selected from the group of electrically nonconductive materials consisting of organic or inorganic polymers, ceramics, glass, glass-ceramics, polyimide-epoxy, epoxy-fiberglass, and the like. In some embodiments, the dielectric material is a polyimide, a LCP, silicone, parylene, a PEEK, or combinations thereof. The third polymer layer may be comprised of the same material or a different material from that of the first polymer layer 405 and the second polymer layer 420. In some embodiments, the first polymer layer 405 comprises LCP, the second polymer layer 420 comprises LCP, and the third polymer layer 422 comprises LCP.

In various embodiments, the thin-film structure 400 may further comprise one or more additional supporting structures that may support one or more additional electronic structures of the neural interface portion 412 such as an electrode, sensor, conductor, and/or connector. FIGS. 4B-4F show forming the neural interface portion 412 of the thin-film structure 400 on the supporting structure formed in FIG. 4A that is electrically connected to the conductive traces 415 formed in FIGS. 4A and 4B. As shown in FIGS. 4B and 4C, forming the neural interface portion 412 comprises forming a wiring layer 425 in a pattern on the first polymer layer 405 and/or the second polymer layer 420. The wiring layer 425 may be formed at the same time as forming the conductive traces 415, or may be formed subsequent to forming the conductive traces 415. For example, the wiring layer 425 and the conductive traces 415 may be deposited as a continuous layer of conductive material, or may be deposited as two separate metallization layers of conductive material that are in electrical contact with one another. The wiring layer 425 may be formed in the same manner as described in detail with respect to the conductive traces 415.

In some embodiments, forming the neural interface portion 412 further comprises forming the second polymer layer 420 and/or the third polymer layer 422 over the wiring layer 425 and the first polymer layer 405. As described herein, the second polymer layer 420 may be comprised of dielectric material (i.e., an insulator) selected from the group of electrically nonconductive materials consisting of organic or inorganic polymers, ceramics, glass, glass-ceramics, polyimide-epoxy, epoxy-fiberglass, and the like. In certain embodiments, the dielectric material is a polyimide, a LCP, parylene, silicone, a PEEK, or combinations thereof. The second polymer layer 420 may be comprised of the same material or a different material from that of the first polymer layer 405.

Figure 4D:
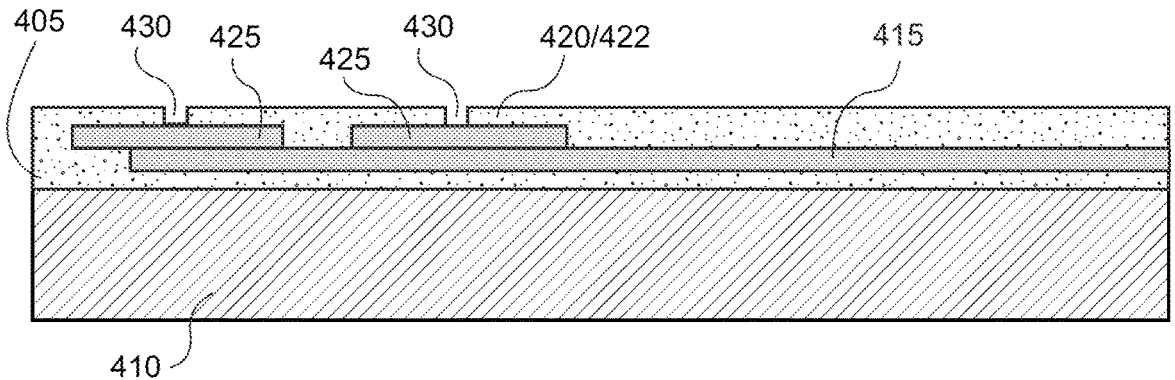
Figure 4E:
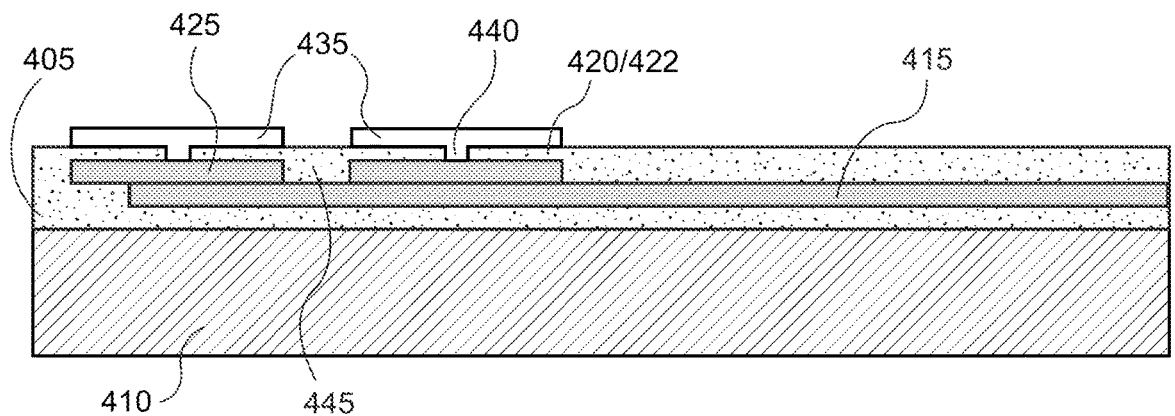

As shown in FIG. 4D, forming the neural interface portion 412 further comprises forming contact vias 430 in the second polymer layer 420 or the third polymer layer 422 to the wiring layer 425. The contact vias 430 can e.g. be formed using conventional lithographic, etching, and cleaning processes, known to those of skill in the art. FIG. 4E shows electrodes (optionally one or more sensors) 435 and contacts 440 formed on and within the contact vias 430 to the portion of the top surface the wiring layer 425. In various embodiments, the electrodes 435 (optionally one or more sensors) and contacts 440 may be formed using conventional processes. For example, a conductive material may be blanket deposited on the second polymer layer 420, including within the contact vias 430 and in contact with the portion of the top surface the wiring layer 425. The conductive material may be copper (Cu), gold (Au), silver (Ag), gold/chromium (Au/Cr), platinum (Pt), platinum/iridium (Pt/Ir), titanium (Ti), gold/titanium (Au/Ti), or any alloy thereof, for example. Once the conductive material is deposited, the conductive material may be patterned using conventional lithography and etching processes to form at least one electrode 435 or a pattern of electrodes 435 as shown in FIG. 4E, for example. In some embodiments, at least one electrode 435 is formed on the second polymer layer 420 such that the at least one electrode 435 is in electrical contact with at least a portion of a top surface of the wiring layer 425. In some embodiments, the pattern of electrodes 435 may include each electrode 435 spaced apart from one another via a portion or region 445 of the second polymer layer 420. It should be understood by those of skill in the art that different patterns are also contemplated by the present disclosure.

Figure 4F:
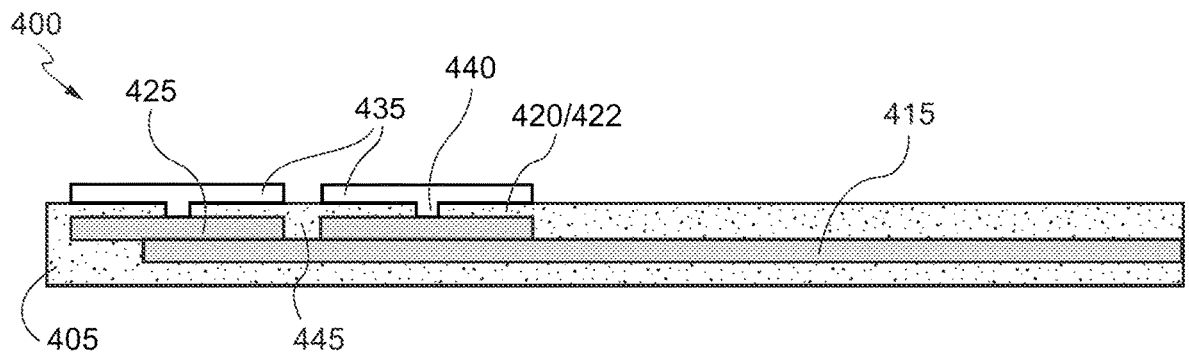

FIG. 4F shows the thin-film structure 400 including the first polymer layer 405, the conductive traces 415, the wiring layer 425, the second polymer layer 420, the electrodes 435, and the contacts 440 detached from the substrate 410. In some embodiments, detaching the thin-film structure 400 from the substrate 410 may include removal of the substrate (e.g., selective etching), and cleaning (e.g., a step-wise rinsing process) at least top surfaces of the electrodes 435 and the second polymer layer 420 with acetone, isopropyl alcohol, non-ionic surfactant, a liquid detergent system, and/or deionized water to remove residual material such as remaining adhesive material.

Figure 5A:
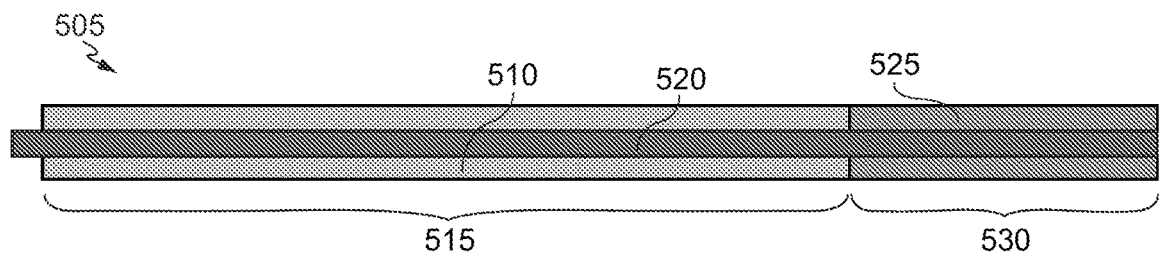
FIGS. 5A-5J show cross-sectional views of structures and respective processing steps for fabricating a thin-film lead assembly in accordance with various embodiments.

FIGS. 5A-5J show cross-sectional views of the structures and respective processing steps for fabricating a thin-film lead assembly 500 and structures thereof described in FIGS. 1, 2A, 2B, 3A, 3B, and 4A-4F. FIG. 5A shows a beginning structure 505 for a thin-film lead assembly. The beginning structure 505 comprises a polymer tube 510 disposed around a first portion 515 of a mandrel 520. The polymer tube 510 is comprised of a medical grade polymer material, for example, a soft polymer such as silicone. The polymer tube 510 covers a region of the mandrel 520 upon which the cable of the thin-film lead assembly is to be formed. The beginning structure 505 further comprises a first heat shrink tube 525 disposed around a second portion 530 of the mandrel 520. In some instances, the first heat shrink tube 525 is comprised of one or more polymer resins, for example, a fluoropolymer such as the FluoroPEELZ® peelable heat shrink tubes, fluorinated ethylene propylene (FEP), etc. The first heat shrink tube 525 covers a region of the mandrel 520 upon which the neural interface of the thin-film lead assembly is to be formed.

Figure 5B:
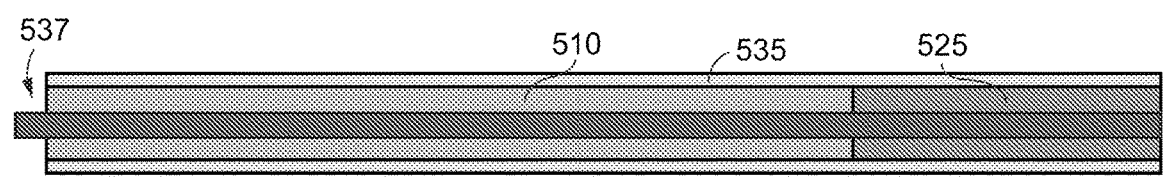

FIG. 5B shows forming a first layer of polymer 535 (e.g., a layer of the encapsulation layers) on the polymer tube 510 and the first heat shrink tube 525 to obtain a first intermediate structure 537. The first layer of polymer 535 may be comprised of a medical grade polymer material. In some embodiments, the medical grade polymer is a thermosetting plastic or thermoplastic. For example, the medical grade polymer may be a soft polymer such as silicone, a polymer dispersion such as latex, a chemical vapor deposited poly (p-xylylene) polymer such as parylene, or a polyurethane such as Bionate® PCU or CarboSil® TSPCU. In certain instances, the first layer of polymer 535 is polyurethane.

Figure 5C:
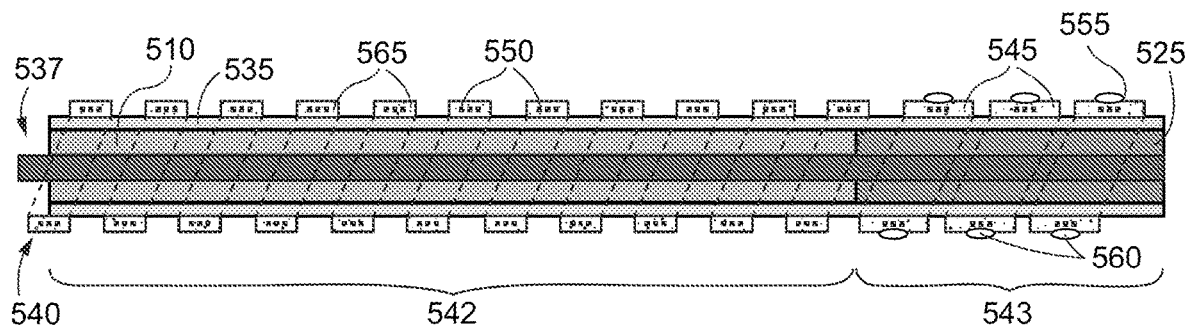

FIG. 5C shows a thin-film structure 540 (e.g., the thin-film structure 400 may be obtained as discussed with respect to FIGS. 4A-4F) being wrapped around the first intermediate structure 537. The thin-film structure 540 comprises a cable portion 542 and a neural interface portion 543. The cable portion 542 comprises a supporting structure 545 and conductive traces 550. The cable portion is helically wrapped around the first layer of polymer 535 formed on the polymer tube 510. The helixes may be wrapped in a clockwise direction or anti-clockwise direction. In some instances, the cable portion 542 is wrapped loosely around the first layer of polymer 535 formed on the polymer tube 510. The "wrapped loosely" configuration means that the turns are loosely packed with an edge to edge distance of at least 0.5 mm between each turn of the helixes. The neural interface portion 543 comprises the supporting structure 545, wiring layer 555, one or more electrodes 560, and optional contacts (not shown). The neural interface portion 543 is helically wrapped around the first layer of polymer 535 formed on the heat shrink tube 525. The helixes may be wrapped in a clockwise direction or anti-clockwise direction. In some instances, the neural interface portion 543 is wrapped tightly around the first layer of polymer 535 formed on the heat shrink tube 525. The "wrapped tightly" configuration means that the turns are tightly packed with an edge to edge distance of less than 0.5 mm between each turn of the helixes.

Figure 5D:
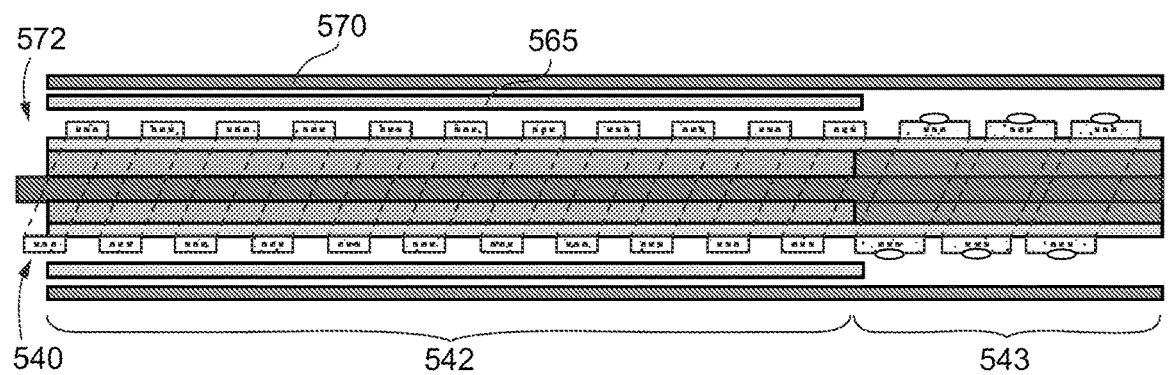

FIG. 5D shows forming a second layer of polymer 565 (e.g., a layer of the encapsulation layers) on the cable portion 542 of the thin-film structure 540. The second layer of polymer 565 may be comprised of a medical grade polymer material. In some embodiments, the medical grade polymer is a thermosetting plastic or thermoplastic. For example, the medical grade polymer may be a soft polymer such as silicone, a polymer dispersion such as latex, a chemical vapor deposited poly(p-xylylene) polymer such as parylene, or a polyurethane such as Bionate® PCU or CarboSil® TSPCU. As shown, the second layer of polymer 565 is not formed on the neural interface portion 543 of the of the thin-film structure 540 such that the second layer of polymer 565 does not cover a top surface of the one or more electrodes 560. FIG. 5D further shows a second heat shrink tube 570 placed over the second layer of polymer 565 and the neural interface portion 543 of the of the thin-film structure 540 to obtain a second intermediate structure 572. In some instances, the second heat shrink tube 570 is comprised of one or more polymer resins, for example, a fluoropolymer such as the FluoroPEELZ® peelable heat shrink tubes, FEP, etc.

Figure 5E:
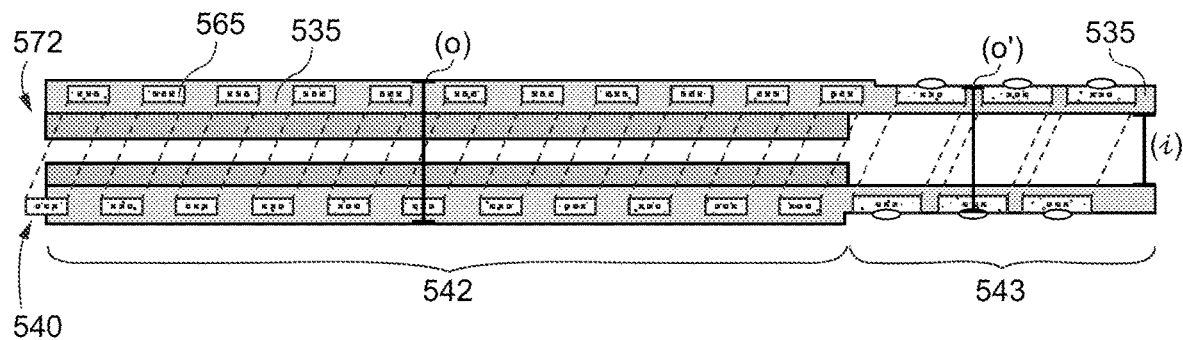

FIG. 5E shows the second intermediate structure 572 being heated to: (i) heat shrink the first heat shrink tube 525 to define an inner diameter (i) of the neural interface portion 543 of the thin-film structure 540, (ii) heat shrink the second heat shrink tube 570 to define a first outer diameter (o) of the cable portion 542 of the thin-film structure 540 and a second outer diameter (o') of the neural interface portion 543 of the thin-film structure 540 (where the first outer diameter is greater than the second outer diameter because of the second layer of polymer 565 formed over the cable portion 542), and (iii) at the same time melt and reflow (thermal reflow) the first layer of polymer 535 and the second layer of polymer 565 to encase completely or partially each of the cable portion 542 and the neural interface portion 543 in the polymer. The heating process may include baking the second intermediate structure 572 in an oven, use of a heat gun, application of hot air, like methods, or any combination thereof. In some instances, the second intermediate structure 572 is heated at 180° C. to 210° C., for example about 200° C., for 15 to 40 minutes, for example 25 minutes. In certain instances, the first heat shrink tube 525 and the second heat shrink tube 570 shrink or recover at a given temperature (e.g., about 200° C.) and the first layer of polymer 535 and the second layer of polymer 565 reflow at or about the same given temperature (e.g., about 200° C.).

Consequently, as the second intermediate structure 572 is heated to the given temperature, the first heat shrink tube 525 maintains its size (nowhere to shrink because it is wrapped onto the mandrel 520) and defines a smooth inner surface with a precisely controlled inner diameter (i) of the neural interface portion 543. Substantially simultaneously, the second heat shrink tube 570 shrinks (because at a same time/temperature the first layer of polymer 535 and the second layer of polymer 565 are liquefying allowing for the second heat shrink tube 570 to shrink) to define a smooth outer surface with a precisely controlled first outer diameter (o) of the cable portion 542 and a precisely controlled second outer diameter (o') of the neural interface portion 543. Substantially simultaneously, the first layer of polymer 535 and the second layer of polymer 565 liquefy and flow around the helically wrapped cable portion 542 of the thin-film structure 540 (the thin-film structure 540 does not liquefy because it comprises a polymer (e.g., LCP) with a higher reflow temperature than the given temperature) and completely encase the cable portion 542 within the polymer.

Substantially simultaneously, the first layer of polymer 535 liquefies and flows around the helically wrapped neural interface portion 543 of the thin-film structure 540 (the thin-film structure 540 does not liquefy because it comprises a polymer (e.g., LCP) with a higher reflow temperature than the given temperature) and partially encases the neural interface portion 543 within the polymer (only partially because the second layer of polymer 565 is not formed over the neural interface portion 543, thus leaving exposed the top surface of the electrodes). Thereafter, the second intermediate structure 572 is cooled (e.g., at ambient temperature), the first heat shrink tube 525 and the second heat shrink tube 570 are peeled away, and the mandrel 520 is withdrawn to obtain the third intermediate structure 575, as shown in FIG. 5F.

Figure 5F:
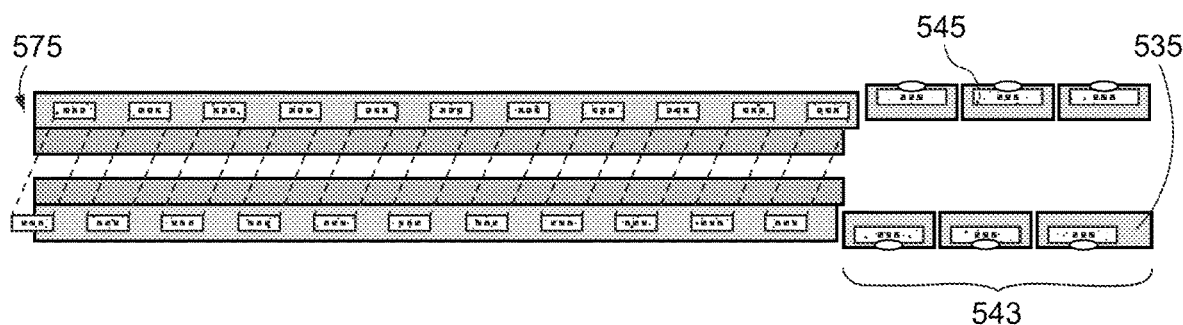

FIG. 5F shows the neural interface portion 543 of the third intermediate structure 575 being unwrapped from the first heat shrink tube 525. The unwrapping process includes cutting through a portion of the neural interface portion 543 to unwrap the polymer layers. In some instances, a laser is used to cut through the reflowed first layer of polymer 535 along a line defined by the supporting structure 545. In certain instances, the reflowed first layer of polymer 535 is cut in such a manner that the reflowed first layer of polymer 535 remains partially encasing the neural interface portion 543 within the polymer (e.g., remains encasing at least the bottom and sides of the supporting structure 545). The unwrapping process includes separating the neural interface portion 543 helixes along the cut line and unwrapping the neural interface portion 543 from the first heat shrink tube 525.

Figure 5G:
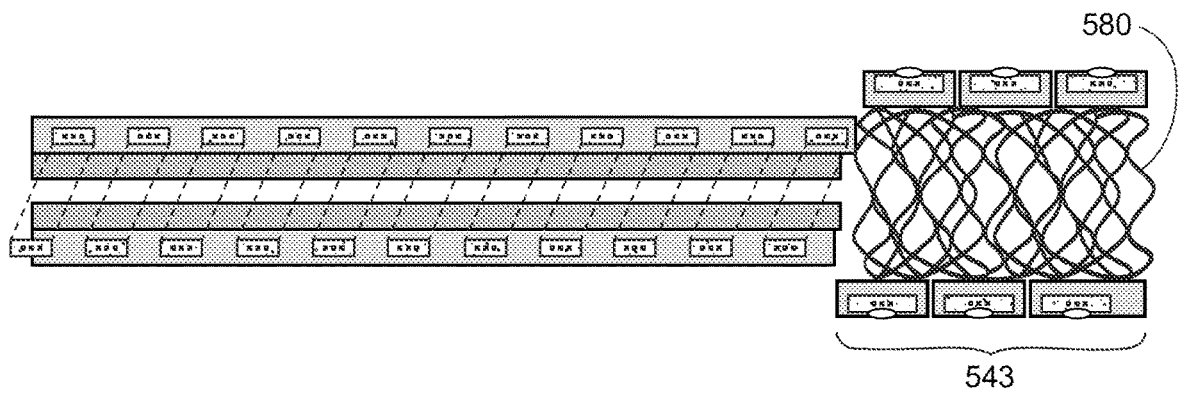
Figure 5H:
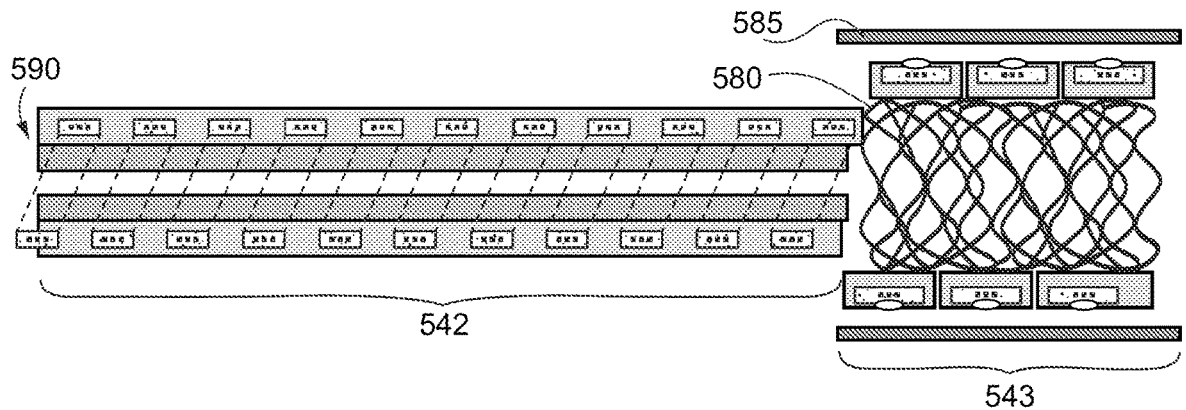

FIG. 5G shows the unwrapped neural interface portion 543 being rewrapped around a stent 580. The neural interface portion 543 is helically wrapped around the stent 580. The helixes may be wrapped in a clockwise direction or anti-clockwise direction. In some instances, the neural interface portion 543 is wrapped tightly around the stent 580. The "wrapped tightly" configuration means that the turns are tightly packed with an edge to edge distance of less than 0.5 mm between each turn of the helixes. FIG. 5H shows a third heat shrink tube 585 placed over the neural interface portion 543 and the stent 580 to obtain a fourth intermediate structure 590. In some instances, the thirst heat shrink tube 585 is comprised of one or more polymer resins, for example, a fluoropolymer such as the FluoroPEELZ® peelable heat shrink tubes, FEP, etc. The third heat shrink tube 585 covers the neural interface of the neural interface portion 543 and the stent 580; whereas the cable portion 542 remains uncovered.

Figure 5I:
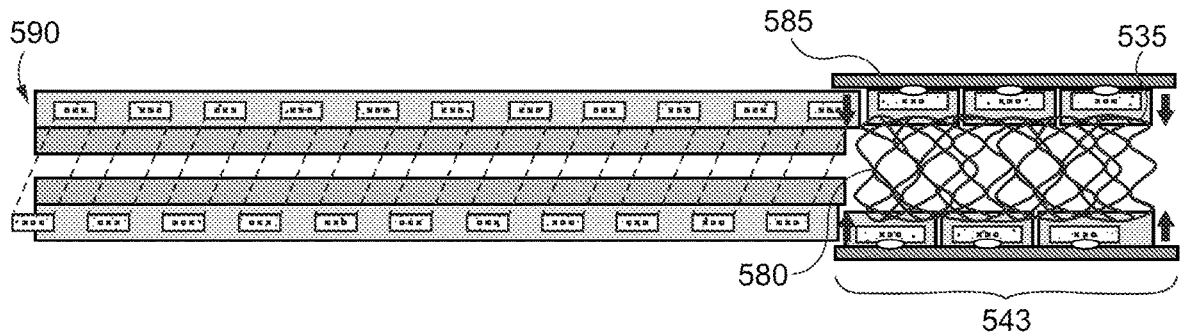
Figure 5J:
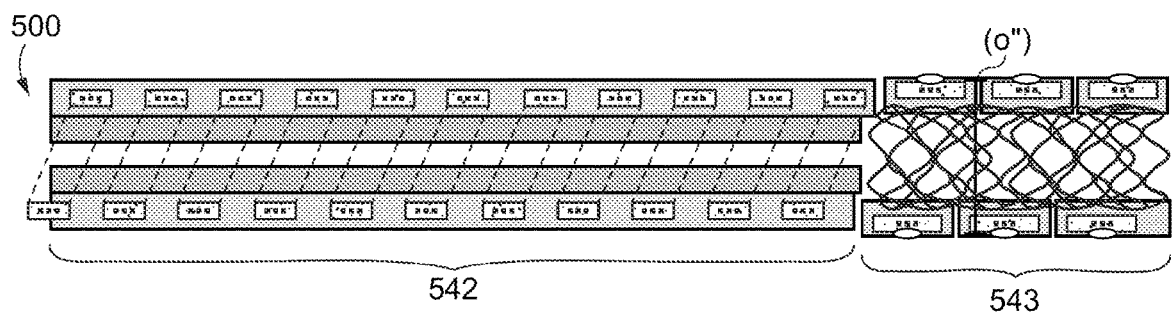

FIG. 5I shows the neural interface portion 543 of the fourth intermediate structure 590 being heated to: (i) heat shrink the third heat shrink tube 585 to compress the stent 580 to a compressed configuration, and (ii) at the same time melt and reflow (thermal reflow) the first layer of polymer 535 to encase completely or partially the stent 580 in the polymer. The heating process may include baking the neural interface portion 543 of the fourth intermediate structure 590 in an oven, use of a heat gun, application of hot air, like methods, or any combination thereof. In some instances, the neural interface portion 543 of the fourth intermediate structure 590 is heated at 180° C. to 210° C., for example about 200° C., for 15 to 40 minutes, for example 25 minutes. In certain instances, the fourth heat shrink tube 585 shrinks or recovers at a given temperature (e.g., about 200° C.) and the first layer of polymer 535 reflows at or about the same given temperature (e.g., about 200° C.). Consequently, as the neural interface portion 543 of the fourth intermediate structure 590 is heated to the given temperature, the third heat shrink tube 585 shrinks (because the stent 580 can compress under force) to define a compressed configuration with a precisely controlled outer diameter (o"). Substantially simultaneously, the first layer of polymer 535 liquefies and flows around and through the mesh structure of the stent 580 and completely or partially encases the stent 580 within the polymer. Thereafter, the fourth intermediate structure 590 is cooled (e.g., at ambient temperature) to obtain the thin-film lead assembly 500, as shown in FIG. 5J. Optionally, the third heat shrink tube may be removed and the thin-film lead assembly may be inserted into a delivery device that maintains the neural interface portion and the stent in a compressed configuration.

While the manufacturing processes of a thin-film lead assembly and structures thereof have been described at some length and with some particularity with respect to a specific steps, it is not intended that the processes be limited to any such particular set of steps. Instead, it should be understood the manufacturing processes described herein are exemplary embodiments, and that the manufacturing processes are to be construed with the broadest sense to include variations of the steps to meet specific design and/or performance need described herein, as well as other variations that are well known to those of skill in the art. For example, the various intermediate and final structures described may be adjusted or modified with treatments to increase wettability of the thin-film lead assembly or to seal the ends of the lumens to meet specific design and/or performance needs. Furthermore, it is to be understood that other steps have been omitted from the description of the manufacturing processes for simplicity and clarity. The omitted steps may include obtaining or fabricating the polymer tubes, waiting predetermined amounts of time for curing or thermosetting, etc.

VI. Methods for Delivering a Thin-Film Lead Assembly

Figure 6:
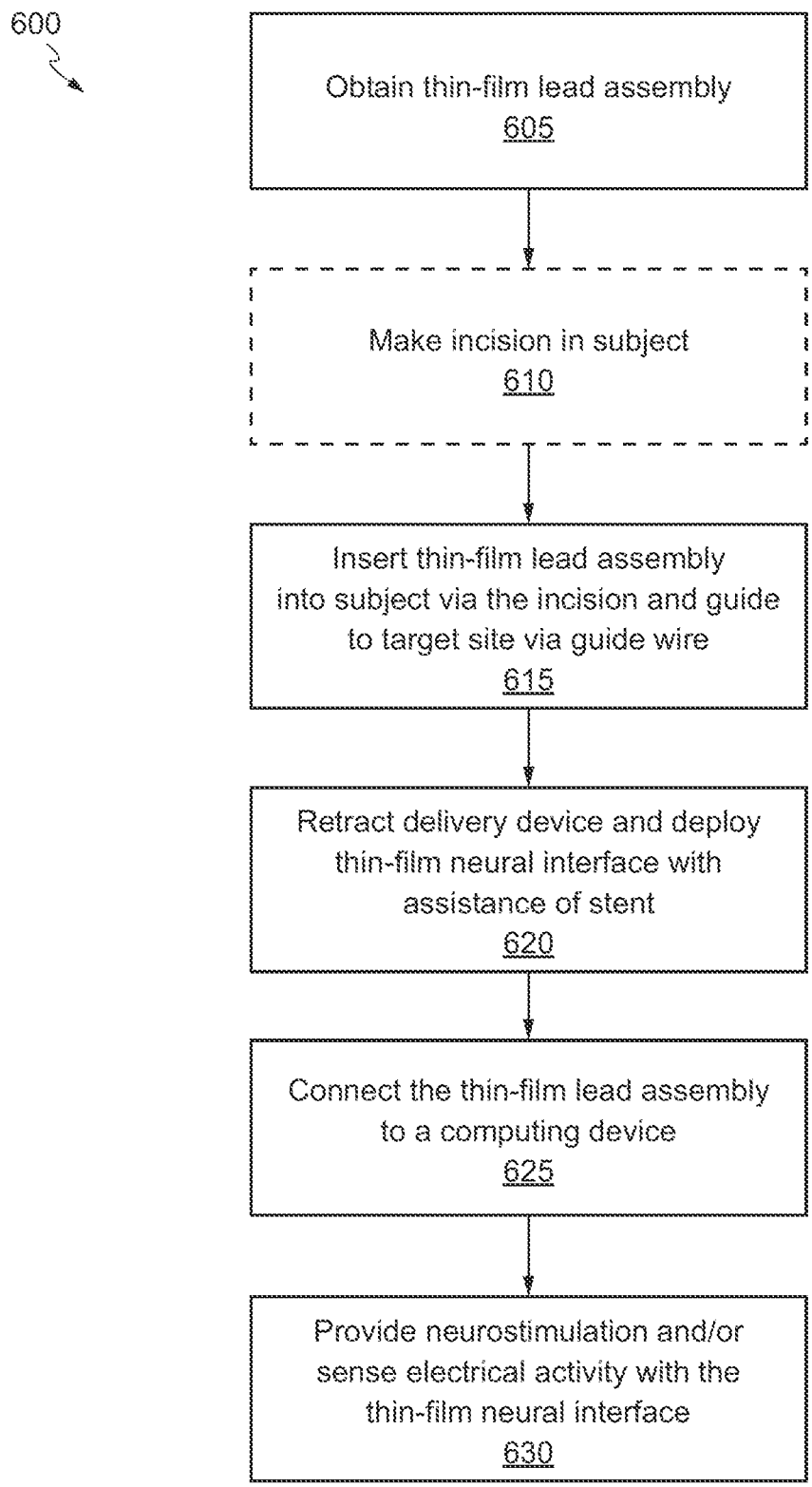
FIG. 6 shows a simplified flowchart depicting processing performed for accessing a site of a target biological structure and delivering a medical device or system for neurostimulation or interfacing to the site of the target biological structure in accordance with various embodiments.

FIG. 6 depicts a simplified flowchart depicting processing performed for accessing a site of a target biological structure in a patient and delivering a medical device or system for neurostimulation or interfacing to the site of the target biological structure according to various embodiments. As noted herein, the flowchart of FIG. 6 illustrates the architecture, functionality, and operation of possible implementations of systems, devices, and methods described with respect to FIGS. 1, 2A, 2B, 3A, 3B, 4A-4F, and 5A-5J. In this regard, each block in the flowchart or block diagrams comprises one or more processes or procedures. It should also be noted that, in some alternative implementations, the processes or procedures noted in each block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combination of blocks in the block diagrams and/or flowchart illustration, can be implemented manually by a user such as a surgeon or by special purpose hardware-based systems that perform the specified functions or acts, or combinations of special purpose hardware and computer instructions stored on a non-transitory storage medium.

Figure 7A:
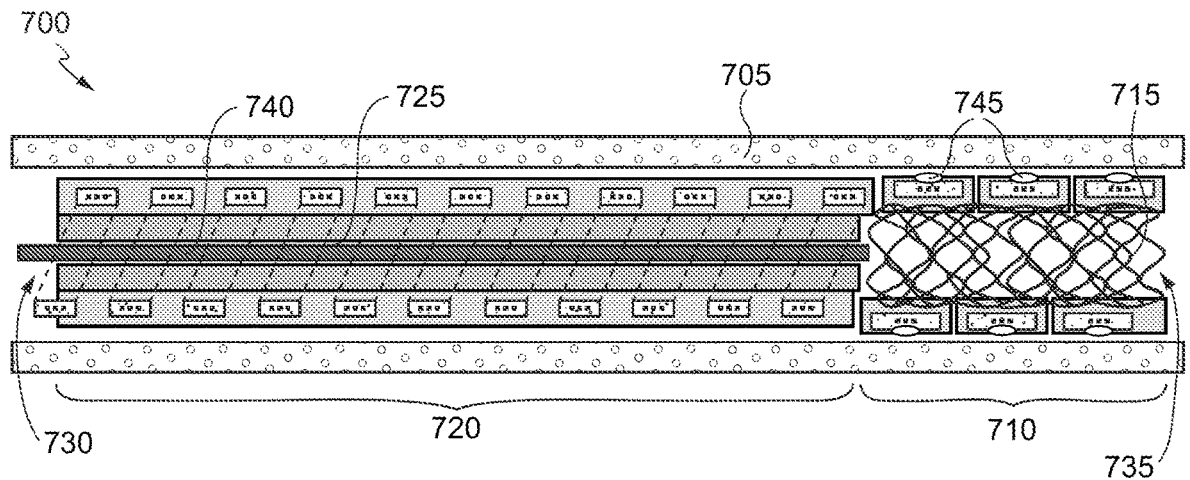
FIGS. 7A and 7B show a compressed configuration and expanded configuration of a thin-film lead assembly, respectively, in accordance with various embodiments.
Figure 7B:
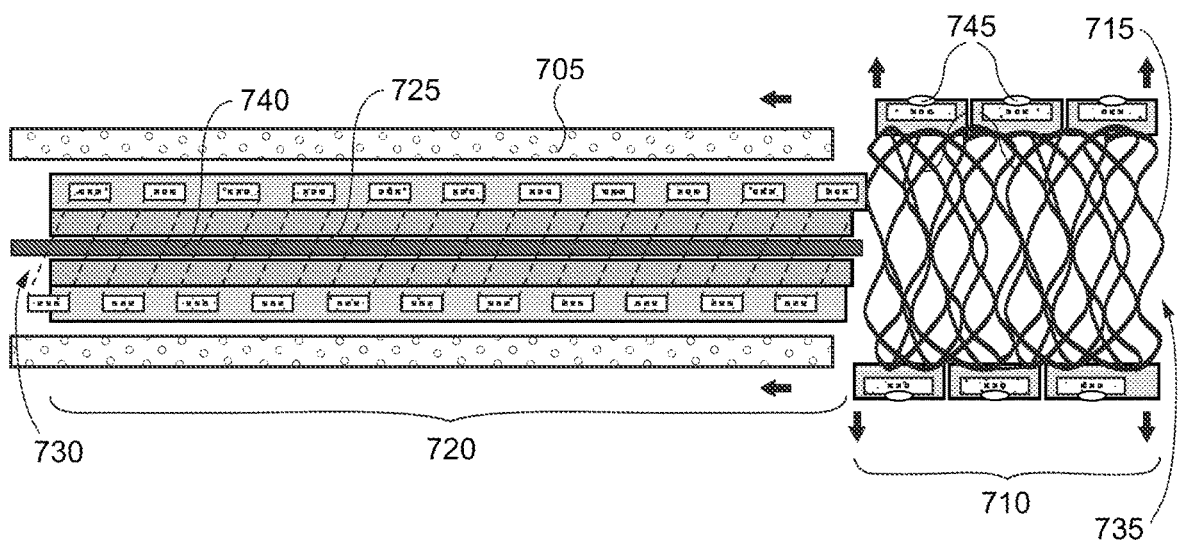

FIG. 6 shows a method of delivering a thin-film lead assembly to a target biological structure. At step 605, a thin-film lead assembly is placed within a delivery device (e.g., a delivery sheath) in a compressed configuration to deliver the thin-film lead assembly to a target biological structure. Alternatively, a medical device is obtain comprising the thin-film lead assembly predisposed within a delivery device (e.g., a delivery sheath) in a compressed configuration to deliver the thin-film lead assembly to a target biological structure. As shown in FIG. 7A, the delivery device 705 is configured to compress a portion of or the entire length the thin-film neural interface 710 and the stent 715, which allows efficient delivery of the thin-film lead assembly 700 regardless of the orientation of the stent 715. In addition, use of the delivery device 705 can prevent engagement/interfacing of the thin-film lead assembly 700 with tissue or bodily fluid until the delivery device 705 is removed or the stent 715 is deployed from the delivery device 705. The delivery device 705 may comprise a removable material (e.g., peelable or absorbable material) that surrounds or covers at least the thin-film neural interface 710 and the stent 715. In some instances, the delivery device 705 is made from one or more of an implantable grade resorbable or non-resorbable polymer and/or metal material. In certain instances, the delivery device 705 comprises one or more of polypropylene, polyester, nylon, polyether ether ketone (PEEK), polyurethane, polycarbonate, titanium, and stainless steel.

With reference back to FIG. 6, at optional step 610, one or more incisions are made in a subject (e.g., a patient) to access a target biological structure. At step 615, the thin-film lead assembly is inserted and/or guided into a cavity of a body (optionally through the one or more incisions) to a target site of the biological system. As shown in FIG. 7A, the cable portion 720 of the thin-film lead assembly 700 comprises a lumen 725 that extends from a proximal end 730 of the thin-film lead assembly 700 through the stent 715 to a distal end 735 of the thin-film lead assembly 700. The lumen 725 may have a diameter wide enough to receive a guide wire 740 for guiding the thin-film lead assembly 700 to a target site of the biological system. At step 620, once the thin-film lead assembly reaches the target site of the biological system, the delivery device is retracted from at least the thin-film neural interface, and the stent is used to deploy the thin-film neural interface. A shown in FIG. 7B, once the thin-film lead assembly 700 is at a target location, the delivery device 705 is removed from the distal end 735 of the thin-film lead assembly 700 and the guide wire 740 is removed from the lumen 725. Thereafter, the thin-film neural interface 710 is deployed using the stent 715. The deploying comprises expanding the stent 715 from the compressed configuration (FIG. 7A) to an expanded configuration (FIG. 7B) that places the electrodes 745 into contact with the target biological structure (e.g., a blood vessel wall).

In some instances, the stent 715 is deployed and expands automatically once the delivery device is retracted from the stent 715 (e.g., once the compression force provided by the delivery device is removed, the stent automatically expands (for example, memory shape expansion)). In other instances, the stent 715 is deployed and expands semi-automatically or manually once the delivery device is retracted from the stent 715 (e.g., once the compression force provided by the delivery device is removed, the stent is expanded using one or more mechanism such as balloon assisted deployment). In some instances, the stent 715 is deployed in a blood vessel and the stent 715 is a cylindrical mesh tube such that blood flow is uninterrupted through the blood vessel. Advantageously, the helical wrapping of the thin-film neural interface 710 around the stent 715 allows for the thin-film neural interface 710 to loosen and expand as the stent 715 expands. Moreover, the "wrapped tightly" configuration means that the thin-film neural interface 710 can support a dense arrangement electrodes 745 for interfacing consistently with the target biological structure.

With reference back to FIG. 6, at step 625, the thin-film lead assembly is connected to a computing device (e.g., a pulse generator or an interfacing processor). As described with respect to FIG. 1, the computing device can be implantable, semi-implantable, or an external system. At step 630, the neural interface is used to provide neurostimulation and/or sense electrical activity at the target biological structure.

While the invention has been described in detail, modifications within the spirit and scope of the invention will be readily apparent to the skilled artisan. It should be understood that aspects of the invention and portions of various embodiments and various features recited above and/or in the appended claims may be combined or interchanged either in whole or in part. In the foregoing descriptions of the various embodiments, those embodiments which refer to another embodiment may be appropriately combined with other embodiments as will be appreciated by the skilled artisan. Furthermore, the skilled artisan will appreciate that the foregoing description is by way of example only, and is not intended to limit the invention.

What is claimed is:

1. A medical device comprising:
   a thin-film neural interface comprising:
      a first portion of a supporting structure comprised of dielectric material;
      a wiring layer formed on the first portion of the supporting structure;
      one or more electrodes formed on the first portion of the supporting structure and electrically connected to the wiring layer; and
      one or more encapsulation layers encasing a portion of the first portion of the supporting structure;
   a stent at least partially embedded in the one or more encapsulation layers, wherein the thin-film neural interface is helically wrapped around at least a portion of the stent; and
   a cable comprising:
      a second portion of the supporting structure comprised of the dielectric material;
      one or more conductive traces formed on the second portion of the supporting structure and electrically connected with the wiring layer; and
      the one or more encapsulation layers encasing at least a portion of the second portion of the supporting structure.

2. The medical device of claim 1, wherein the cable further comprises a polymer tube and the second portion of the supporting structure is helically wrapped around the polymer tube.

3. The medical device of claim 2, wherein the polymer tube comprises a lumen.

4. The medical device of claim 2, wherein the one or more encapsulation layers comprise a first encapsulation layer and a second encapsulation layer, the first encapsulation layer encases the portion of the first portion of the supporting structure leaving at least top surfaces of the one or more electrodes exposed, and the first encapsulation layer and the second encapsulation layer completely encase the second portion of the supporting structure.

5. The medical device of claim 4, wherein the stent is at least partially embedded in the first encapsulation layer, and wherein the dielectric material is liquid crystal polymer.

6. The medical device of claim 4, wherein the one or more encapsulation layers are comprised of polyurethane.

7. The medical device of claim 2, wherein the thin-film neural interface is helically wrapped around at least the portion of the stent such that an edge to edge distance of less than 0.5 mm is present between each turn of helixes.

8. The medical device of claim 2, wherein the second portion of the supporting structure is helically wrapped around the polymer tube such that an edge to edge distance of at least 0.5 mm is present between each turn of helixes.

9. The medical device of claim 2, wherein the cable further comprises a proximal end and a distal end, and the thin-film neural interface is disposed at the distal end of the cable.

10. The medical device of claim 9, further comprising:
    a connector disposed at the proximal end of the cable and electrically connected to the one or more conductive traces; and
    a neurostimulator or computing device electrically connected with the one or more electrodes via the connector, the one or more conductive traces, and the wiring layer.

11. A method of manufacturing a thin-film lead assembly, comprising:
    forming a first layer of polymer on a polymer tube and a first heat shrink tube disposed on a mandrel;
    obtaining a thin-film structure comprising a neural interface portion and a cable portion;
    helically wrapping the cable portion around the polymer tube and the neural interface portion around the first heat shrink tube;
    forming a second layer of polymer on the cable portion;
    placing a second heat shrink tube over the second layer of polymer and the neural interface portion;
    heating the cable portion and the neural interface portion to: (i) reflow the first layer of polymer and the second layer of polymer around at least a portion of the cable portion, (ii) reflow the first layer of polymer around a portion of the neural interface portion, and (iii) recover the second heat shrink tube defining an outer diameter of the cable portion;
    unwrapping the neural interface portion from the first heat shrink tube;
    helically wrapping the neural interface portion around at least a portion of a stent;
    placing a third heat shrink tube over the neural interface portion; and
    heating the neural interface portion to: (i) reflow the first layer of polymer around at least a portion of the stent, (ii) recover the third heat shrink tube compressing the neural interface portion and the stent, and (iii) obtain the thin-film lead assembly.

12. The method of claim 11, further comprising obtaining an initial structure comprising: (i) the polymer tube disposed around a first portion of the mandrel, and (ii) the first heat shrink tube disposed around a second portion of the mandrel.

13. The method of claim 11, wherein the neural interface portion comprises: a first portion of a supporting structure, a wiring layer formed on the first portion of the supporting structure, and one or more electrodes formed on the first portion of the supporting structure and electrically connected to the wiring layer, and wherein the cable portion comprises a second portion of the supporting structure, and one or more conductive traces formed on the second portion of the supporting structure and electrically connected with the wiring layer.

14. The method of claim 13, wherein the first portion of the supporting structure is comprised of liquid crystal polymer, the second portion of the supporting structure is comprised of liquid crystal polymer, the first layer of polymer is comprised of polyurethane, and the second layer of polymer is comprised of polyurethane.

15. The method of claim 11, further comprising removing the third heat shrink tube and inserting the thin-film lead assembly into a delivery device that maintains the neural interface portion and the stent in a compressed configuration.

16. The method of claim 11, wherein the neural interface is helically wrapped around at least the portion of the stent such that an edge to edge distance of less than 0.5 mm is present between each turn of helixes.

17. The method of claim 11, wherein the cable portion is helically wrapped around the polymer tube such that an edge to edge distance of at least 0.5 mm is present between each turn of helixes.

18. The method of claim 11, wherein unwrapping the neural interface portion comprises cutting through the reflowed first layer of polymer along a cut line defined by the first portion of a supporting structure, separating helixes of the neural interface portion along the cut line, and unwrapping the neural interface portion from the first heat shrink tube.

19. A method of delivering a neural interface to a target biological structure, comprising:
   obtaining a thin-film lead assembly comprising:
      a thin-film structure comprising a neural interface portion and a cable portion, wherein the neural interface portion comprises: a first portion of a supporting structure, one or more electrodes formed on the first portion of the supporting structure, and one or more encapsulation layers encasing a portion of the first portion of the supporting structure, and wherein the cable portion comprises: a second portion of the supporting structure, the one or more encapsulation layers encasing at least a portion of the second portion of the supporting structure, and a polymer tube with a lumen and the second portion of the supporting structure is helically wrapped around the polymer tube;
      a stent at least partially embedded in the one or more encapsulation layers, wherein the neural interface is helically wrapped around at least a portion of the stent; and
      a delivery device disposed over the thin-film lead assembly that maintains the neural interface portion and the stent in a compressed configuration;
   inserting a guide wire into the lumen of the thin-film lead assembly;
   delivering, using the guide wire, the thin-film lead assembly to the target biological structure;
   removing the delivery device and guide wire from the thin-film lead assembly; and
   deploying, using the stent, the neural interface, wherein the deploying comprises expanding the stent from the compressed configuration to an expanded configuration that places the one or more electrodes into contact with the target biological structure.

20. The method of claim 19, wherein the second portion of the supporting structure is helically wrapped around the polymer tube such that an edge to edge distance of at least 0.5 mm is present between each turn of helixes, and wherein the neural interface is helically wrapped around at least the portion of the stent such that an edge to edge distance of less than 0.5 mm is present between each turn of helixes.

* * * * *